(12) United States Patent
Abts et al.

(10) Patent No.: US 12,277,444 B2
(45) Date of Patent: Apr. 15, 2025

(54) SOFTWARE-DEFINED TENSOR STREAMING MULTIPROCESSOR FOR LARGE-SCALE MACHINE LEARNING

(71) Applicant: Groq, Inc., Mountain View, CA (US)

(72) Inventors: Dennis Charles Abts, Eau Claire, WI (US); Jonathan Ross, Palo Alto, CA (US); Garrin Kimmell, Mountain View, CA (US); Michael Bye, Chippewa Falls, WI (US); Matthew Boyd, Gresham, OR (US); Andrew Ling, Toronto (CA)

(73) Assignee: Groq, Inc., Mountain View, CA (US)

( * ) Notice: Subject to any disclaimer, the term of this patent is extended or adjusted under 35 U.S.C. 154(b) by 240 days.

(21) Appl. No.: 17/993,564

(22) Filed: Nov. 23, 2022

(65) Prior Publication Data

US 2023/0161621 A1    May 25, 2023

Related U.S. Application Data

(60) Provisional application No. 63/283,094, filed on Nov. 24, 2021.

(51) Int. Cl.
*G06F 9/48*     (2006.01)
*G06F 9/50*     (2006.01)
(Continued)

(52) U.S. Cl.
CPC .......... *G06F 9/4881* (2013.01); *G06F 9/5072* (2013.01); *G06F 15/163* (2013.01); *G06F 15/7867* (2013.01)

(58) Field of Classification Search
None
See application file for complete search history.

(56) References Cited

U.S. PATENT DOCUMENTS 11,474,557 B2    10/2022    Thorson et al.
2019/0121779 A1*    4/2019    Osborne ................. G06F 9/30
(Continued)

OTHER PUBLICATIONS

Hadi Jooybar, Wilson W. L. Fung, Mike O'Connor, Joseph Devietti, Tor M. Aamodt, "GPUDet: a deterministic GPU architecture", AC, pp. 1-12 (Year: 2013).*

(Continued)

*Primary Examiner* — Courtney P Spann
(74) *Attorney, Agent, or Firm* — Dority & Manning, P.A.

(57) ABSTRACT

A system contains a network of processors arranged in a plurality of nodes. Each node comprises a respective plurality of processors connected via local links, and different nodes are connected via global links. The processors of the network communicate with each other to establish a global counter for the network, enabling deterministic communication between the processors of the network. A compiler is configured to explicitly schedule communication traffic across the global and local links of the network of processors based upon the deterministic links between the processors, which enable software-scheduled networking with explicit send or receive instructions executed by functional units of the processors at specific times, to establish a specific ordering of operations performed by the network of processors. In some embodiments, the processors of the network of processors are tensor streaming processors (TSPs).

21 Claims, 18 Drawing Sheets

(51) Int. Cl.
G06F 15/163 (2006.01)
G06F 15/78 (2006.01)

(56) References Cited

U.S. PATENT DOCUMENTS

| | | | | |
|---|---|---|---|---|
| 2021/0326173 | A1* | 10/2021 | Shah | G06F 9/3836 |
| 2021/0342673 | A1* | 11/2021 | Shah | G06N 3/063 |
| 2022/0075633 | A1* | 3/2022 | Desai | G06V 40/166 |
| 2022/0357984 | A1* | 11/2022 | Kotler | G06F 9/544 |
| 2023/0116614 | A1* | 4/2023 | Shi | H04L 45/50 |
| | | | | 370/252 |

OTHER PUBLICATIONS

Abts, D. et al. "Age-based packet arbitration in large-radix k-ary n-cubes," ACM/IEEE conference on Supercomputing, Association for Computing Machinery, Article No. 5, Nov. 2007, pp. 1-11.

Abts, D. et al. "Think Fast: A Tensor Streaming Processor (TSP) for Accelerating Deep Learning Workloads," ACM/IEEE 47th Annual International Symposium on Computer Architecture, May 30-Jun. 3, 2020, pp. 145-158.

Ahn, J.H. et al. "HyperX: topology, routing, and packaging of efficient large-scale networks," Conference on High Performance Computing Networking, Article No. 41, Nov. 2009, pp. 1-11.

Alverson, B. et al. "Cray XC Series Network," Cray Inc., White Paper WP-Aries01-1112, 2012, pp. 1-28.

Brown, T. et al. "Language Models are Few-Shot Learners," Advances in Neural Information Processing Systems, No. 33, 2020, pp. 1-24.

Cerebras.net "Cerebras CS-1," Apr. 12, 2021, six pages, Retrieved from the Internet Archive URL: <https://web.archive.org/web/20210412190256/https://cerebras.net/>.

Dally, W.J. "Virtual-Channel Flow Control," IEEE Transactions on Parallel and Distributed Systems, vol. 3, No. 2, Mar. 1992, pp. 194-205.

Dally, W.J. et al. "Principles and Practices of Interconnection Networks," Morgan Kaufmann Inc, 2004.

Flajslik, M. et al. "Megafly: A Topology for Exascale Systems," International Conference on High Performance Computing, Jun. 24, 2018, pp. 289-310.

Glass, C. et al. "The Turn Model for Adaptive Routing," 25 years of the International Symposia on Computer architecture, Aug. 1, 1998, pp. 441-450.

Haidar, A. et al. "High-performance Cholesky factorization for GPU-only execution," General Purpose GPUs, Feb. 4-5, 2017, pp. 42-52.

Herault, T. et al. "Generic Matrix Multiplication for Multi-GPU Accelerated Distributed-Memory Platforms over PaRSEC," IEEE/ACM 10th Workshop on Latest Advances in Scalable Algorithms for Large-Scale Systems, Nov. 18, 2019, pp. 33-41.

Huang, Y. et al. "Pipe: Efficient Training of Giant Neural Networks using Pipeline Parallelism," Advances in Neural Information Processing Systems, No. 32, 2019, pp. 1-10.

Jiang, N. et al. "Indirect Adaptive Routing on Large Scale Interconnection Networks," 36th Annual International Symposium on Computer Architecture, Jun. 20, 2009, pp. 220-231.

Karpathy, A. "Keynote," Conference on Computer Vision and Pattern Recognition, Workshop on Autonomous Driving, Jun. 20, 2021, Retrieved from Youtube <URL: https://www.youtube.com/watch?v=g6bOwQdCJrc>.

Kermani, P. et al. "Virtual cut-through: A new computer communication switching technique," Computer Networks (1976), vol. 3, No. 4, Sep. 1979, pp. 267-286.

Kim, J. et al. "Flattened Butterfly Topology for On-Chip Networks," 40th Annual IEEE/ACM International Symposium on Microarchitecture, Dec. 1-7, 2007, pp. 172-182.

Kim, J. et al. "Microarchitecture of a High-Radix Router," 32nd International Symposium on Computer Architecture, 2005, pp. 420-431.

Kim, J. et al. "Technology-Driven, Highly-Scalable Dragonfly Topology," 2008 International Symposium on Computer Architecture, Jun. 21-25, 2008, pp. 77-88.

Lee, M. et al. "Probabilistic Distance-Based Arbitration: Providing Equality of Service for Many-Core CMPs," 43rd Annual IEEE/ACM International Symposium on Microarchitecture, Dec. 4-8, 2010, pp. 509-519.

McKeown, N. et al. "OpenFlow: Enabling Innovation in Campus Networks," ACM SIGCOMM Computer Communication Review, vol. 38, No. 2, Mar. 31, 2008, pp. 69-74.

Medina, E. "Habana Labs Approach to Scaling AI Training," Hot Chips 31 Symposium, Aug. 18-20, 2019, pp. 1-29.

Narayanan, D. et al. "Efficient Large-Scale Language Model Training on GPU Clusters," International Conference for High Performance Computing, Networking, Storage and Analysis, Article No. 58, Nov. 13, 2021, pp. 1-15.

Narayanan, D. et al. "PipeDream: Generalized Pipeline Parallelism for DNN Training," 27th ACM Symposium on Operating Systems Principles, Oct. 27, 2019, pp. 1-15.

NVIDIA "Matrix Multiplication Background," User's Guide, Nov. 2021, pp. 1-17.

NVIDIA "NVIDIA Dgx BasePOD," Date Unknown, eight pages, [Online] [Retrieved on Dec. 2, 2022] Retrieved from the Internet URL: < https://www.nvidia.com/en-us/data-center/dgx-basepod/>.

Prabhakar, R. et al. "Plasticine: A Reconfigurable Architecture for Parallel Patterns," ACM/IEEE 44th Annual International Symposium on Computer Architecture, Jun. 24-28, 2017, pp. 389-402.

Scott, S. "Rosetta: A 64-port Switch for Cray's Slingshot Interconnect," IEEE Symposium on High-Performance Interconnects, Aug. 16, 2019, [Abstract Only].

Scott, S. et al. "The Blackwidow High-Radix Clos Network," ACM SIGARCH Computer Architecture News, vol. 34, No. 2, May 1, 2006, pp. 16-28.

Shoeybi, M. et al. "Megatron-LM: Training Multi-Billion Parameter Language Models Using Model Parallelism," Sep. 17, 2019, pp. 1-15.

Shpiner, A. et al. "Dragonfly+: Low Cost Topology for Scaling Datacenters," IEEE 3rd International Workshop on High-Performance Interconnection Networks in the Exascale and Big-Data Era, Feb. 5, 2017, pp. 1-8.

U.S. Appl. No. 17/203,214, filed Mar. 16, 2021, Inventor Dennis Charles Abts and Jonathan Alexander Ross (copy not enclosed).

Williams, S. et al. "Roofline: An Insightful Visual Performance Model for Floating-Point Programs and Multicore Architectures," Communications of the ACM, vol. 52, No. 4, Apr. 1, 2009, pp. 65-76.

Won, J. et al. "Overcoming Far-End Congestion in Large-Scale Networks," IEEE 21st International Symposium on High Performance Computer Architecture, Feb. 7-11, 2015, pp. 415-427.

Young, C. "Evaluation of the Tensor Processing Unit: A Deep Neural Network Accelerator for the Datacenter," Hot Chips 29 Symposium, May 3, 2017, Retrieved from Youtube <URL: https://www.youtube.com/watch?v=fhHAArxwzvQ>.

* cited by examiner

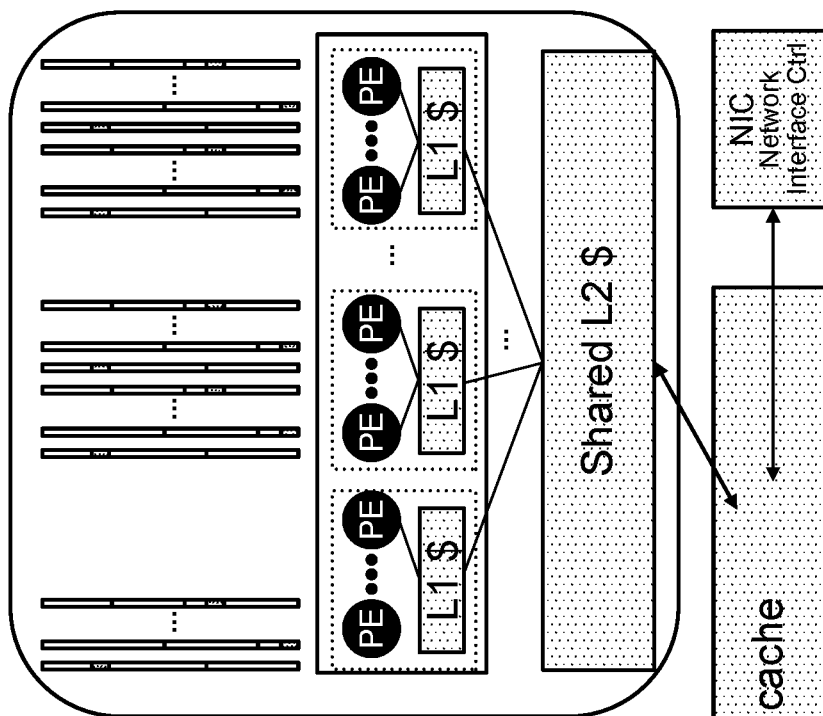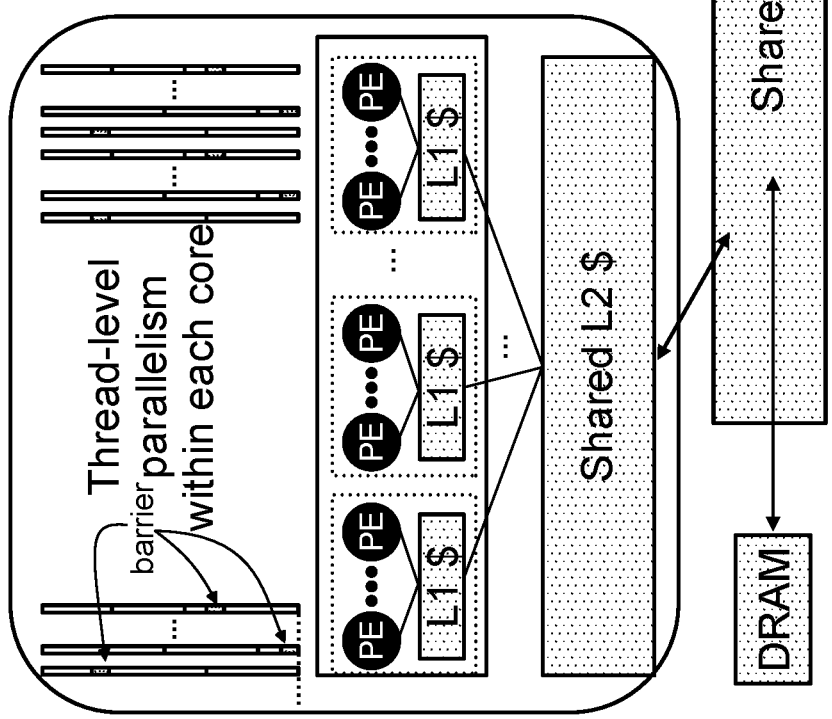
FIG. 1

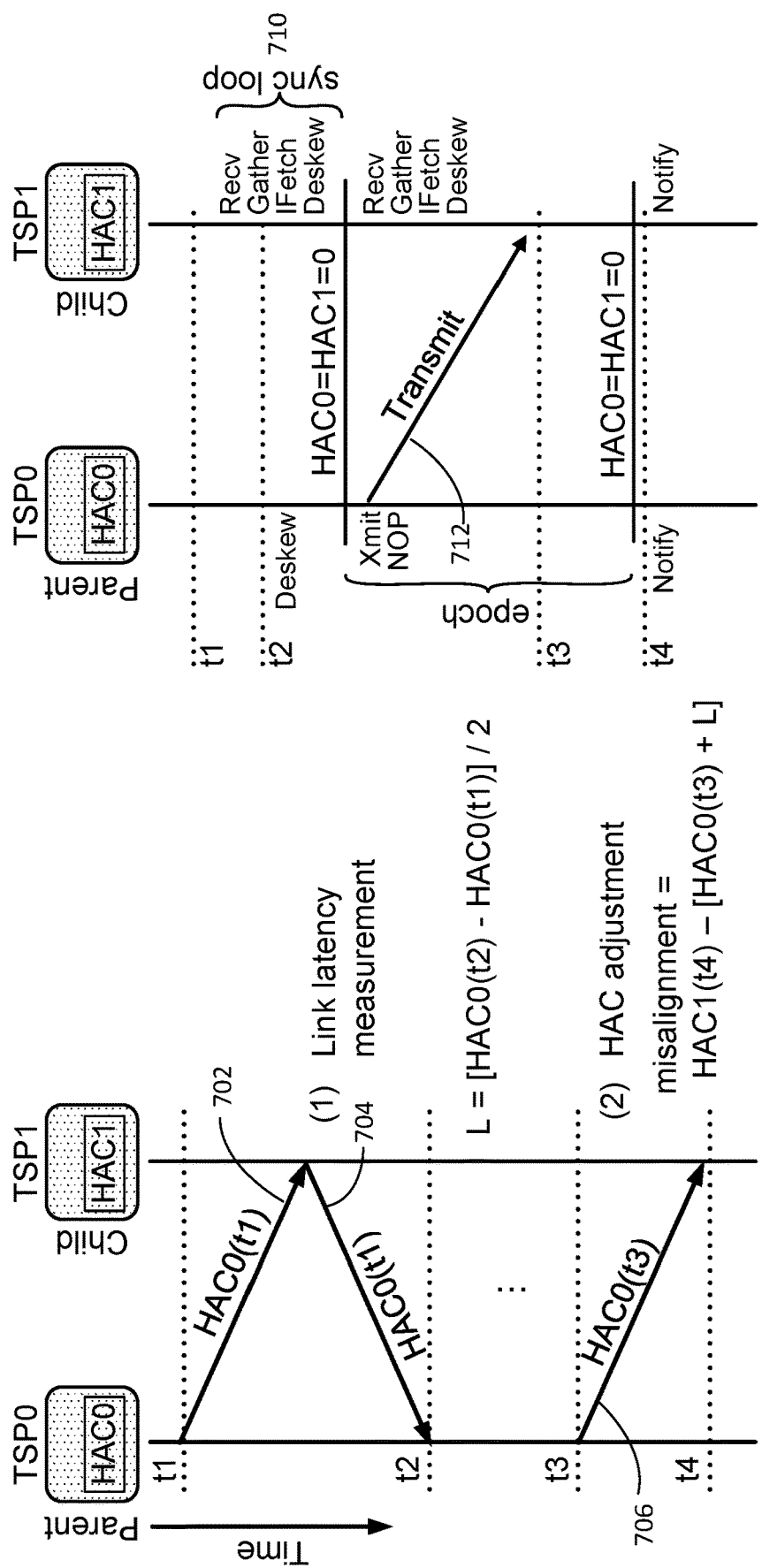

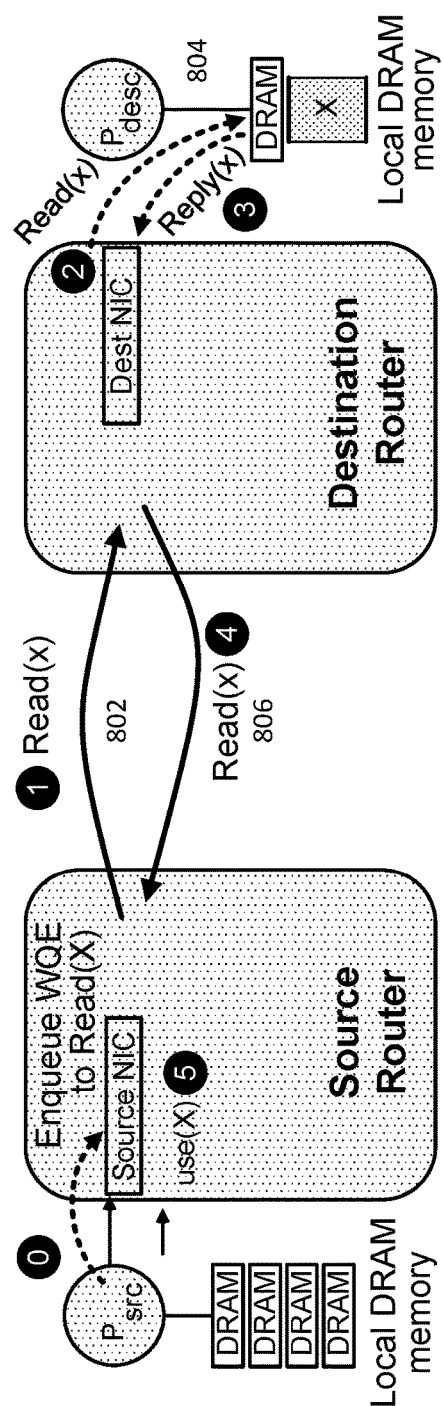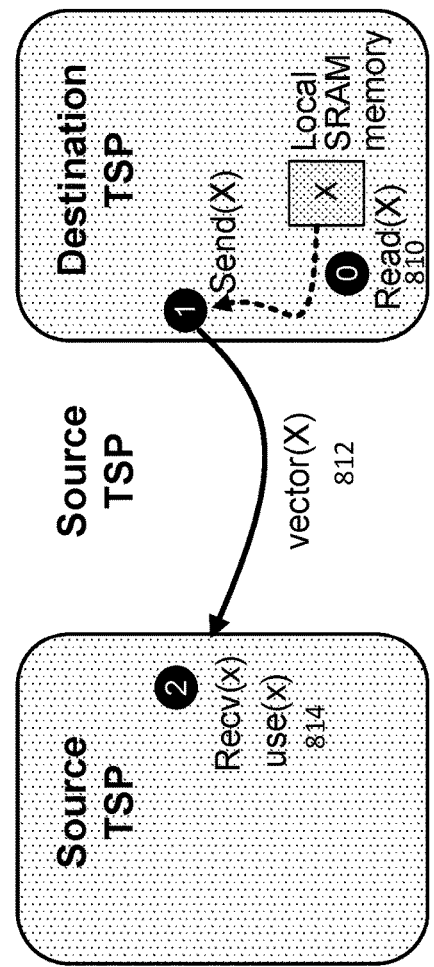
FIG. 8A
FIG. 8B

SOFTWARE-DEFINED TENSOR STREAMING MULTIPROCESSOR FOR LARGE-SCALE MACHINE LEARNING

CROSS-REFERENCE TO RELATED APPLICATIONS

This application claims a benefit and priority under 35 U.S.C. § 119(e) to U.S. Provisional Patent Application Ser. No. 63/283,094, filed on Nov. 24, 2021, which is hereby incorporated by reference in its entirety.

BACKGROUND

The present disclosure relates to tensor processors, and to multiprocessor architectures containing multiple tensor processors.

Historically, high-performance computing (HPC) systems are broadly categorized as capability and capacity systems. This dichotomy arises because of communication latency and bandwidth trade-offs when additional processing elements (PEs) are applied to a fixed-size problem (strong scaling) with the goal of minimizing the program's execution time. Alternatively, additional PEs may be deployed to increase throughput (i.e. weak scaling). This duality requires both novel chip architectures in the underlying PEs and a scalable system architecture with high throughput (bisection bandwidth) and low end-to-end latency (low network diameter) for fine-grained communication necessary to efficiently handle both strong and weak scaling.

SUMMARY

Embodiments of the present disclosure are directed a systems containing a network of processors. The network of processors comprises a plurality of processors arranged in a plurality of nodes, including at least a first node having a first plurality of processors connected by local links. The plurality of nodes are connected by global links. The plurality of processors communicate with each other to establish a global counter for the network, enabling deterministic communication between the plurality of processors of the network. In some embodiments, the system further comprises a compiler configured to explicitly schedule communication traffic across the global and local links of the network of processors, with explicit send or receive instructions executed at specific times to establish a specific ordering of operations performed by the network of processors. In some embodiments, the processors of the network of processors are tensor streaming processors (TSPs).

BRIEF DESCRIPTION OF THE DRAWINGS

The disclosed embodiments have advantages and features which will be more readily apparent from the detailed description and the accompanying figures. A brief introduction of the figures is below.

FIG. 1 illustrates a conventional many-core chip multiprocessor in accordance with some embodiments.

FIG. 7A is a diagram illustrating a process of HAC exchange and adjustment between TSPs of a multi-TSP system, in accordance with some embodiments.

FIG. 7B is a diagram showing HAC-based synchronization procedure utilizing DESKEW instructions in a multi-TSP system, in accordance with some embodiments.

FIG. 8A is a diagram illustrating communication between a pair of processors in a conventional network.

FIG. 8B is a diagram illustrating communication between a pair of TSPs in a multi-TSP system, in accordance with some embodiments.

Figure 2:
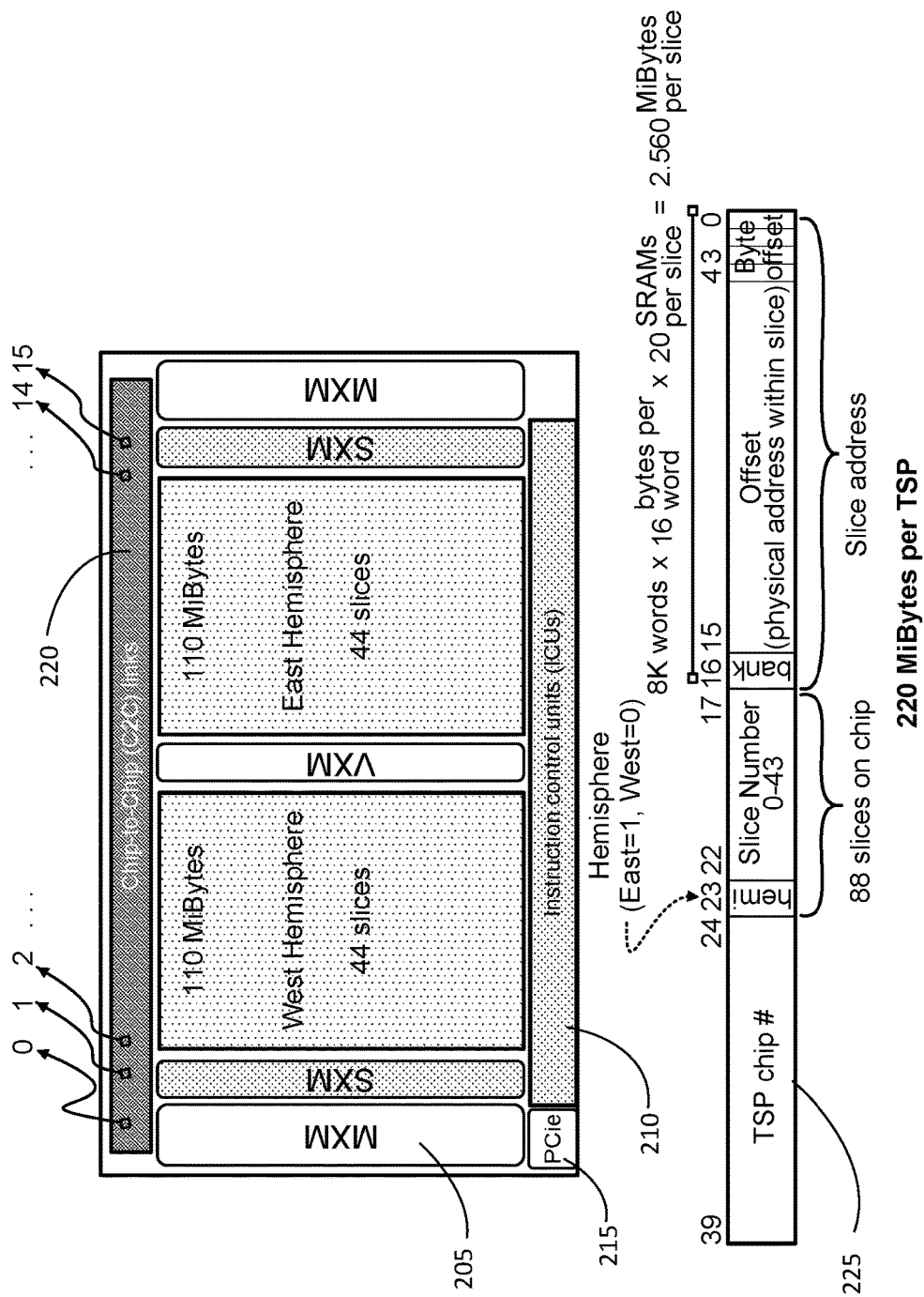
FIG. 2 illustrates a diagram of a TSP that may be used as part of a multi-TSP system, in accordance with some embodiments.

The figures depict embodiments of the present disclosure for purposes of illustration only. One skilled in the art will readily recognize from the following description that alternative embodiments of the structures and methods illustrated herein can be employed without departing from the principles, or benefits touted, of the disclosure described herein.

DETAILED DESCRIPTION

The Figures and the following description relate to preferred embodiments by way of illustration only. It should be noted that from the following discussion, alternative embodiments of the structures and methods disclosed herein will be understood as useful alternatives without departing from the principles of what is claimed.

Reference will now be made in detail to several embodiments, examples of which are illustrated in the accompanying figures. It is noted that wherever practicable similar or like reference numbers are used in the figures to indicate similar or like functionality. The figures depict embodiments of the disclosed system (or method) for purposes of illustration only. One skilled in the art will readily recognize from the following description that alternative embodiments of the structures and methods illustrated herein are useful without departing from the principles described herein.

Embodiments of the present disclosure relate to, but are not limited to, a multi-processor network. In some embodiments, the multi-processor network is implemented as part of deterministic streaming system with multiple deterministic streaming processors (e.g., TSPs or artificial intelligence processors) each having a functional slice architecture. In some embodiments, each deterministic streaming processor is configured to process a machine learning (ML) model or portions of a ML model. Each deterministic streaming processor is divided into a plurality of functional units organized into a plurality of functional slices. Each functional slice is configured to perform specific functions within the deterministic streaming processor, which can include memory functional slices (MEMs) for storing operand data, arithmetic functional slices for performing operations on received operand data (e.g., vector processing, matrix manipulation), and/or the like. Functional units of the deterministic streaming processor are configured to stream operand data across a first (e.g., temporal) dimension in a direction indicated in a corresponding instruction, and receive instructions across a second (e.g., spatial) dimension. The compiler for the deterministic streaming processor is aware of the hardware configuration of the deterministic streaming processor and configures the timing of data and instruction flows such that corresponding data and instructions are intersected at each computational element at a predetermined time. Each functional slice of the deterministic streaming processor can operate on a set of data lanes in a Single Instruction Multiple Data (SIMD) manner. The set of data lanes can be referred to herein as a "superlane" and represents a cross-section of all the functional slices on a processor chip. This superlane structure thus serves to connect the different types of functional slices of the deterministic streaming processor, where corresponding functional units of each slice are arranged in rows connected by a common superlane, where each functional unit is able to receive data from the superlane, process the data, and place processed data back onto the superlane.

An example of a streaming processor is a Tensor Streaming Processor (TSP), developed and manufactured by GROQ, INC. of Mountain View, California. For use in commerce, the GROQ TSP Node™ Accelerator Card is available as a x16 PCI-Express (PCIe) 2-slot expansion card that hosts a single GROQ Chip1™ device. The TSP is a streaming processor based on two key optimizations: (1) machine learning algorithms exhibit abundant data parallelism, which are directly mapped to the scalable architecture, and (2) the scalable architecture enables precise planning for and control of the architecture by compilers, thus greatly increasing performance and power efficiency. Tensor computations (typically computations on vectors and matrices) are performed using a streaming process model where computational tiles, and data storage and switching tiles, are interconnected for data transfers between tiles by a superlane structure. The superlane structure takes advantage of dataflow locality as elements of tensors flow through the architecture to be calculated upon. An example TSP architecture is disclosed in more detail in U.S. patent application Ser. No. 17/203,214 which was filed 16 Mar. 2021, incorporated herein in its entirety.

As discussed above, HPC systems may be used to handle problems with strong scaling or weak scaling. For example, the network demand for training an ML model, often requiring data parallelism (weak scaling), differs from inference on that same model using (pipelined) model parallelism (i.e., strong scaling). The multiprocessor system, interconnection network, and the programming model of the individual processing elements work in unison to collectively execute the different "layers" of a deep learning network. It is this set of sub-tasks, expressed as individual PE programs, that are distributed among the computing elements and responsible for carrying out, or executing, the specifics of the machine learning model.

The burgeoning parameter space of natural language processing (NLP) models like GPT-3 use 100s-of-billions of parameters to achieve state-of-the-art accuracy for a variety of inference applications. These models require significant compute resources for both training and inference to spread the model across multiple processing elements. The computational demands of large models are twofold: requiring memory resources to store model parameters, constants, and gradients to fit into the available memory of each processing element; and load balance the computation (flops) across the processing elements. To efficiently train these models, a variety of techniques have been used to exploit both pipelined (model) parallelism and data (mini-batch) parallelism to load balance and increase the compute intensity of each local sub-task.

FIG. 1 illustrates a conventional many-core chip multiprocessor in accordance with some embodiments. As shown in FIG. 1, in a conventional CPU or GPU multiprocessor, the memory and network resources are dynamically shared among the processing elements. This dynamic sharing of memory (which includes L1 L2, and L3 caches as well as DRAM) and network resources is a source of nondeterminism.

To make an ML model amenable to execution on a parallel computer, the model is decomposed into sub-tasks that can be mapped to the underlying processing elements of the system. The communication cost among the PEs is tightly coupled to the system's packaging hierarchy which seeks to exploit "packaging locality" wherein proximal compute resources are densely connected providing more bandwidth among these highly-connected components. As a result, the parallel decomposition strategy is aligned with the system packaging hierarchy in terms of racks, nodes, and eventually the PEs carrying out the execution of each subtask.

Exemplary System

Embodiments described herein relate to a software-defined system architecture of a scale-out multiprocessor. In some embodiments, the multiprocessor comprises a network of processors, such as a network of deterministic processors. As used herein, a deterministic processor may refer to a processing unit configured to execute a deterministic program. A deterministic program may be distinguished from a non-deterministic program in that the operations performed by a deterministic program on each cycle are known prior to execution (although the particular numerical values processed may not be). Since each operation is known to occur on a particular cycle, execution of timing markers on the same cycles in each program on different processors may be performed in a reliable and predictable manner. For example, in some embodiments, different deterministic processors within a multi-processor network may be configured to send and receive synchronization information at known times within known time ranges, to synchronize operation of the different processors and maintain determinism of the overall system. In some embodiments, a compiler receives a model and generates a deterministic program for implementing the model on a plurality of different chips (e.g., an array of deterministic processors). The different deterministic processors may be configured in a network and run in parallel to increase data processing speeds and reduce the time to obtain results, for example.

A software-defined system of multiple deterministic processors extends the determinism of a single deterministic processor using a software-scheduled high-radix Dragonfly-based network and instruction set architecture (ISA) providing "runtime deskew" instruction support to maintain the illusion of a synchronous, lock-step system. The deterministic multi-processor architecture is described below in terms of deterministic processor endpoints, network topology, routing, flow control, and fault tolerance. While the discussion below relates primarily to a deterministic multi-processor architecture utilizing tensor streaming processors (TSPs) (e.g., a multi-TSP system), it is understood that the same principles may be applied to other types of processors, and to other multiprocessor architectures containing multiple cores.

FIG. 2 illustrates a diagram of a TSP that may be used as part of a multi-TSP system, in accordance with some embodiments. As shown in FIG. 2, the TSP 200 contains functional units aggregated into a plurality of functional process units (or "slices") 205, each corresponding to a particular function type. For example, different functional slices of the processor correspond to processing units for MEM (memory), VXM (vector execution module), MXM (matrix execution module), and SXM (switching and permutation module), etc. The functional units of each slice can share an instruction queue (not shown) that stores instructions, and an instruction control unit (ICU) of ICUs 210 that controls execution flow of the instructions. The instructions in a given instruction queue are executed only by functional units in the queue's associated slice and are not executed by another slice of the processor.

Processor 200 includes communication lanes (also referred to as data lanes or data paths) to carry data between the functional units of different slices. Each communication lane connects to corresponding functional units of adjacent slices 205 of processor 200. By arranging the functional units of processor 200 into different functional slices 205, the on-chip instruction and control flow of processor 200 is decoupled from the data flow. For example, in some embodiments, the instructions and control flow flows in a first direction across the functional units of processor 200 (e.g., along the length of the functional slices 205), while the data flows in a second direction across the functional units of processor 200 (e.g., across the functional slices) that is non-parallel to the first direction, via the communication lanes connecting the slices. The TSP 200 further comprises, in one embodiment, a PCIe interface 215 to communicate with a host system, a plurality of Chip-to-Chip (C2C) links 220 to connect the TSP 200 to other TSPs of the multi-TSP system. In some embodiments, the host system translates a model comprising a plurality of program components that are located onto respective TSPs of the multi-TSP system via the PCie interface of each TSP. During execution of the program components, intermediate data to be communicated between different TSPs of the system is transmitted via the C2C links 220. In some embodiments, the host system loads a plurality of program components onto a TSP of the multi-TSP system via the TSP's PCIe interface, whereupon the TSP may be configured to distribute at least a portion of the plurality of program components to other TSPs of the multi-TSP system via the C2C links 220.

In some embodiments, the functional slices of each TSP 200 are arranged with two hemispheres, each with a respective bank of memory (e.g., 44 slices of memory). In some embodiments, each MEM slice of the TSP contains 20 SRAM units, each configured to store 8K 16-byte words, thus providing 2.56 MB of memory per slice. As such, each TSP provides a total of 220 MB of memory per chip. In some embodiments, the global shared address space utilized by the multi-TSP system is physically distributed among the TSPs of the system. As such, a multi-TSP system having 264 TSPs would have 56 GB of global SRAM memory. In some embodiments, the memory hierarchy of the multi-TSP system can be uniquely addressed as a rank-5 tensor 225 indicating device, hemisphere, slice, bank, and address offset. For example, for a multi-TSP system having N TSPs, where each TSP has two hemispheres each having 44 slices of memory each, the tensor may in the form [Device, Hemisphere, Slice, Bank, Address Offset] with the shape [N, 2, 44, 2, 4096].

In accordance with some embodiments, a multi-TSP system architecture enables a synchronous communication model across a network fabric of TSP elements. The architecture implements a software-scheduled high-radix interconnection network that enables deterministic communication among TSPs and eliminates latency variance. The architecture further includes a hardware-software interface implementation that includes instruction level support to "deskew" and align a set of plesiochronous links between the TSPs of the system, to enable a synchronous distributed programming model and a tensor-based communication protocol that eliminates packet headers/footers. The architecture further enables source-based routing and flow control that enables a software-scheduled network with explicit software control of the traffic pattern and its total ordering of packets across the network.

The programming model of the TSP is based upon a statically scheduled, deterministic execution. For example, programs for TSPs are compiled to generate instructions mapped to specific functional units of the processor, for execution at specific times on a clock cycle-by-cycle basis—i.e., deterministic execution (which eliminates the need for techniques such as using source code instrumentation, processor event recorders, and trace files to measure performance). To enable seamless scalability and preserve that programming model across multiple TSP processing elements in a multi-TSP system, the network also needs to be deterministic. In some embodiments, the multi-TSP system is implemented using a Dragonfly-based topology that is exploited for the software-defined system architecture to provide scalability. In accordance with the described topology, by using a collection of nodes as a group, a virtual high-radix network can be created that enables scalable topology with lower radix nodes, while eliminating intermediate switches that would be used for traditional topologies such as the fat-tree. In other embodiments, other types of high-radix topologies such as Flattened Butterfly or HyperX may be used.

Figure 3A:
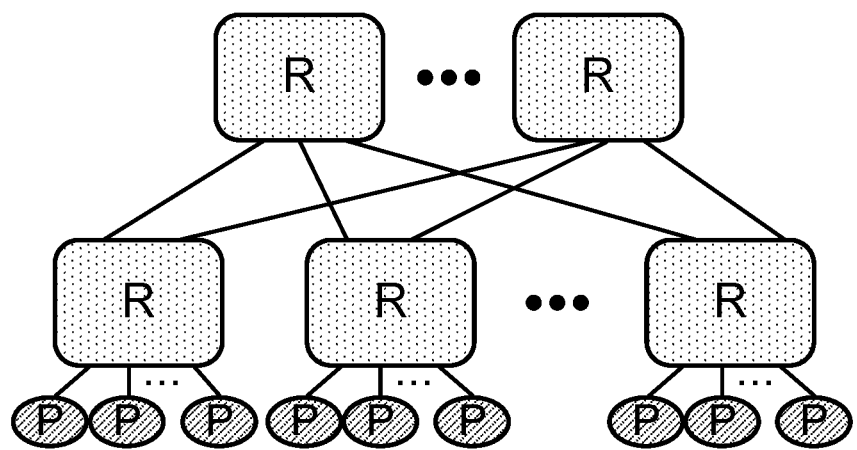
FIGS. 3A-3C are high-level diagrams illustrating different types of network topologies, in accordance with some embodiments.
Figure 3B:
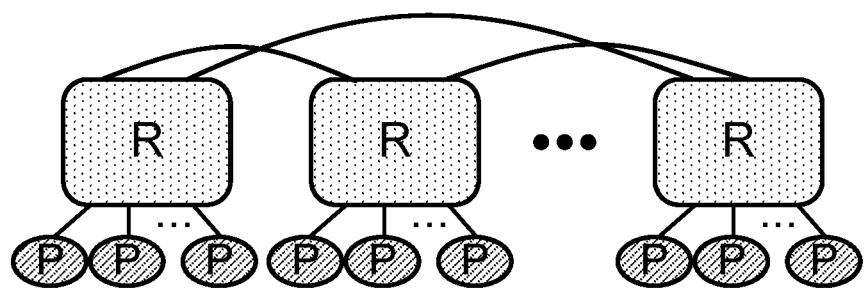
Figure 3C:
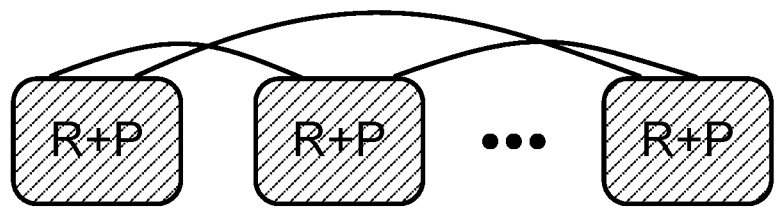

FIGS. 3A-3C are high-level diagrams illustrating different types of network topologies, in accordance with some embodiments. Network system topologies can typically be classified as either indirect or direct networks. FIG. 3A illustrates a diagram of an indirect network, in which systems endpoints and switches are considered "separate," while direct networks, as illustrated in FIG. 3B, can be represented with endpoints and switches being a single "node." While indirect networks such as fat-tree have been commonly used for large-scale systems, they require intermediate switches or routers that introduce non-determinism from dynamic arbitration and queuing. On the other hand, a direct network combines the processing and the routers. For example, a software-scheduled direct network, such as that illustrated in FIG. 3C, shows a software-defined scale-out organization that creates a "glueless" multiprocessor by directly connecting TSPs to create the communication fabric of the system. The scale-out system architecture exploits direct networks to provide direct connectivity between the nodes and eliminate the non-determinism that can be induced by intermediate switches. In addition, by implementing the system as a direct network, the scale-out multi-TSP system topology is able to achieve low network diameter. Because total observed communication latency and variance increases with the number of hops in the network, reducing the network diameter serves to reduce network latency (hop count) as well as lower the network cost.

Figure 4:
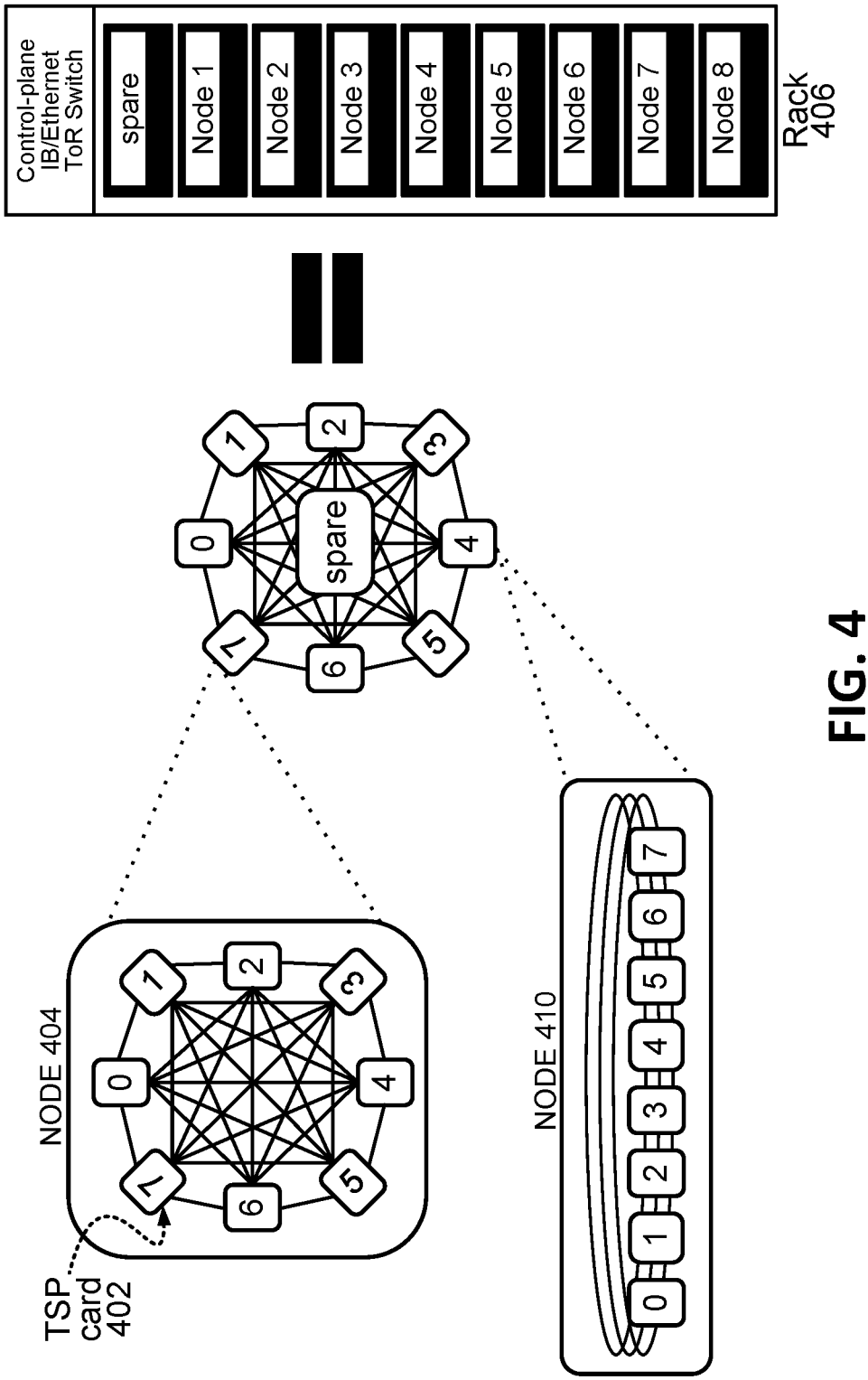
FIG. 4 is a block diagram showing the topology of a scale-out multi-TSP system, in accordance with some embodiments.

FIG. 4 is a block diagram showing the topology of a scale-out multi-TSP system, in accordance with some embodiments. In accordance with some embodiments, the basic building blocks of the multi-TSP system are sets of TSPs 402 referred to as a "node." In some embodiments, each of the TSPs 402 may correspond to the TSP 200 illustrated in FIG. 2, and each node 404 is implemented as a set of TSPs 402 housed within the same chassis enclosure (e.g., eight TSPs housed in a 4U chassis enclosure). For example, as shown in FIG. 4, each node may include eight TSPs.

In some embodiments, the pin-bandwidth of the C2C links of each TSP 402 is partitioned into a first set of "local" links and a second set of "global" links (e.g., n local links and m global links). For example, in some embodiments, the pin-bandwidth of each TSP is partitioned into 7 local links and 4 global links. The local links are used to provide full connectivity between TSPs of the same node 404, which are within the same symmetric multi-processor (SMP) coherence domain, allowing for each TSP to communicate synchronously with the other TSPs of the same node. In addition, the global links for each TSP within a node are combined to create a virtual high-radix router. For example, in some embodiments, the global links for each TSP within a node of eight TSPs are combined to create a 32 "virtual" port high-radix router, to effectively be a "group" that is used as a building block of the Dragonfly-based topology of the multi-TSP system. More generally, using TSPs each having n local links and m global links allows for each node to contain n+1 TSPs, where each TSP can communicate with each of the other TSPs in the node. Each node contains (n+1)×m global links, allowing each the node to act as a (n+1)×m port virtual router. In some embodiments, pairs of TSPs or nodes may be connected via multiple local or global links.

In some embodiments, using nodes with (n+1)×m port virtual routers (e.g., 32-port virtual router) as building blocks, the multi-TSP system can scale out up to ((n+1)× m)+1 nodes (e.g., 33 nodes, for total of 33×8=264 TSPs) with full connectivity between all of the nodes, resulting in a three hop topology with minimal routing. This allows for fine-grained communication across the multi-TSP system and efficient access to the combined global memory located on the TSPs of the system (e.g., 264 TSP system with 56 GiBytes of global SRAM).

In some embodiments, groups of nodes are organized into racks 406, which serve as the next higher layer of the packaging hierarchy. In some embodiments, a rack comprises nine nodes of eight TSPs each, which are interconnected via the four "global" links per TSP for a total of 32×9=288 ports of global bandwidth. In some embodiments, to scale to larger systems, each rack functions as a "local group" of nodes, where the ports of the TSPs within the rack are partitioned into a first set of ports used to connect the nodes of the rack, and a second set of ports for connecting to other racks of the system. For example, in embodiments in which each rack contains nine nodes of eight TSPs each and having 288 ports of global bandwidth as discussed above, the 288 ports may be partitioned such that half of the 288 ports (e.g., 144 ports) are used to doubly-connect the set of nine nodes within each rack to achieve a proper 2בinternal speedup" within the local group to route traffic among the global links. The remaining ports (e.g., 144 ports) are used to connect to other racks in the system, allowing for a maximally configured system to contain up to 145 racks, for a total of 145 (racks)×72 (TSPs per rack)=10,440 TSPs in the system, having an at-most 5 hop diameter (two hops in the source-rack, one global hop, and two hops in the destination-rack).

Packaging Constraints

In accordance with some embodiments, the scale-out multi-TSP system topology implements a hierarchical packaging-aware topology. In some embodiments, the topology of the interconnection network is driven primarily by the packaging constraints imposed by system packaging hierarchy. In particular, while high-radix routers can achieve low network diameter, enabling high-radix can be a challenge in the scale-out system's packaging (pin) constraints. The packaging constraints encountered in designing the system may vary across levels of the hierarchy: from pin-count constraints on the ASIC die level,; area and form-factor constraints at the PCIe card level; general-purpose CPU (non-TSP) compute, power, cooling, and cabling routing constraints at the chassis level; to cable length and power at the rack level.

Figure 5A:
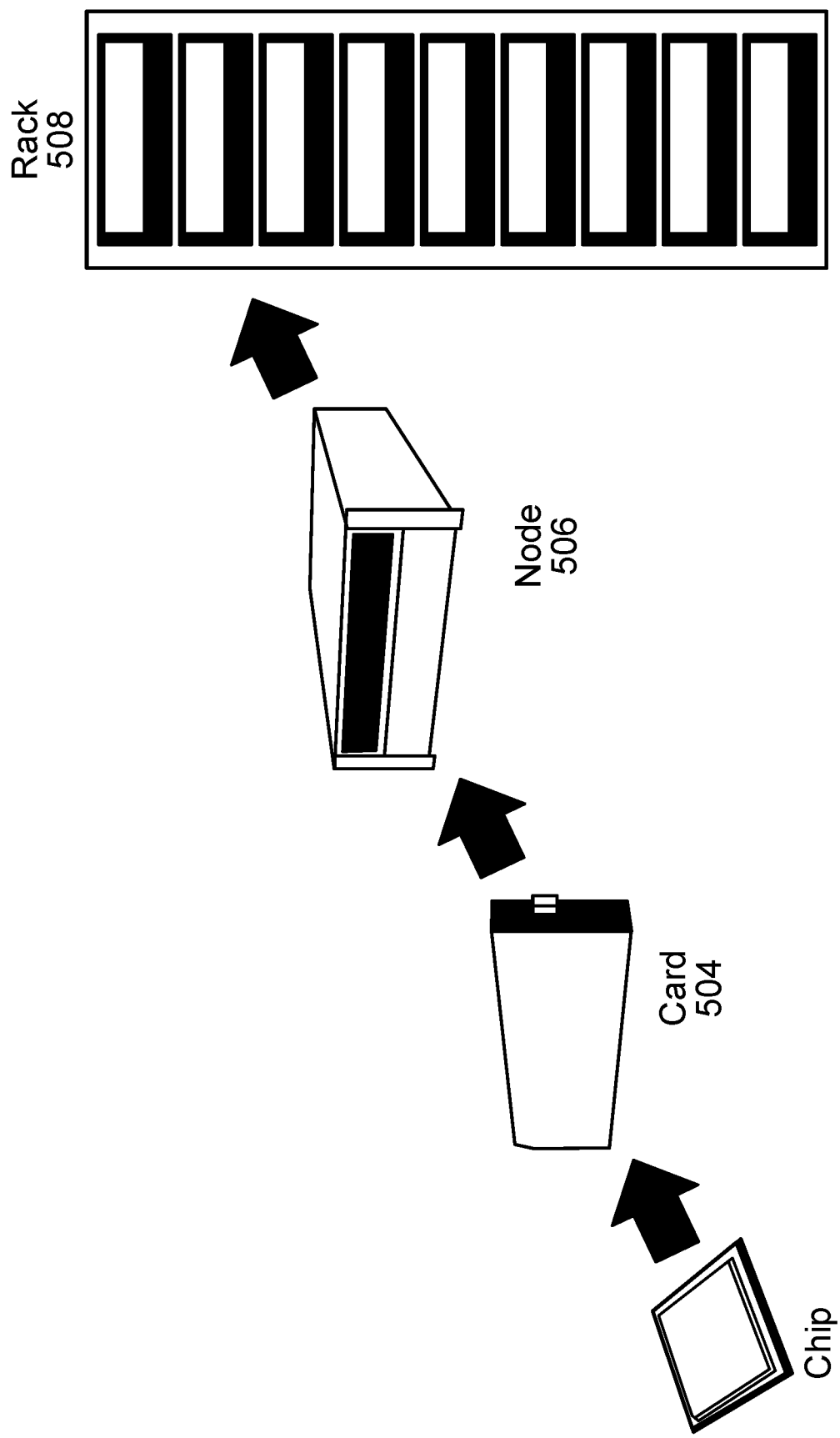
FIG. 5A illustrates a diagram showing the system packaging hierarchy of a multi-TSP system, in accordance with some embodiments.
Figure 5B:
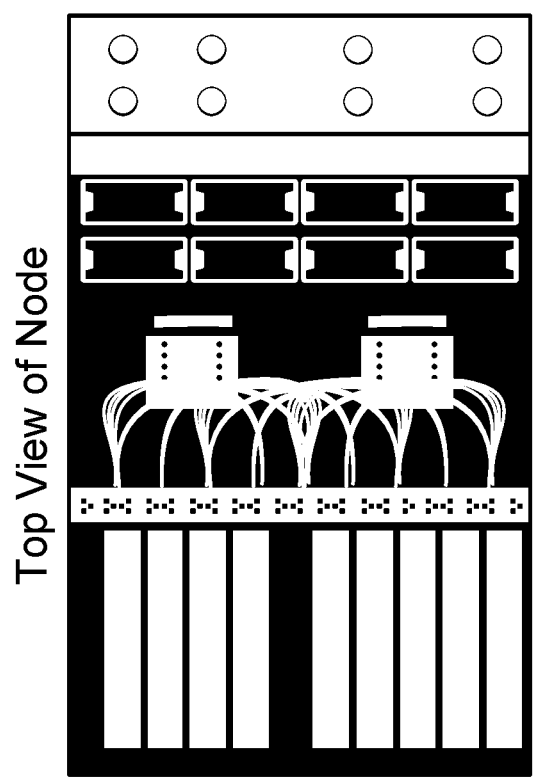
FIG. 5B shows an expanded top-down view of a node 506, in accordance with some embodiments.

FIG. 5A illustrates a diagram showing the system packaging hierarchy of a multi-TSP system, in accordance with some embodiments. As shown in FIG. 5A, the multi-TSP system may include four levels of packaging hierarchy, where each TSP chip 502 is fitted with a heat-sink and packaged on a PCIe card 504. A plurality of TSP cards (e.g., eight TSP cards) are co-located within the shared memory node 506 occupying a unit (e.g., a four rack unit (4RU)) in the rack 508. FIG. 5B shows an expanded top-down view of a node 506, in accordance with some embodiments. As shown in FIG. 5B, each node includes abundant intra-node, low-profile cables within the chassis to exploit packaging locality. While FIGS. 5A and 5B illustrate a single TSP 502 on each PCIe card 504, in other embodiments, multiple processors (e.g., TSPs) may share a single package.

In some embodiments, the C2C links of the TSPs connect the TSPs of the system both within and between nodes. In some embodiments, the C2C links use low-swing differential signaling operating up to 30 Gbps over 34 AWG cables, with the longest cable being 0.75 meter within the node. This low-profile cabling is designed to lay flat underneath the shroud used on the 4U enclosure. Likewise, packaging locality may be exploited to keep cables within the rack relatively short (<2 m), allowing for the use of low-cost QSFP (quad-small form package) electrical cables, and limiting the more expensive active optical cables for longer rack-to-rack connections. In some embodiments, each node has 28 internal C2C cables to fully-connect the eight TSPs with their seven peers within the node. This allows for 73% of the cables (44 of 60 cables used by each node) to be kept short and inexpensive using electrical signaling.

In some embodiments, while the C2C links may support a variety of operating speeds, all links may be operated at the same data rate (e.g., 25.125 Gbps) for both electrical cables within racks and active-optical transceivers between racks, for a combined bandwidth of 100 Gbps across the four lanes comprising a link.

Figure 6:
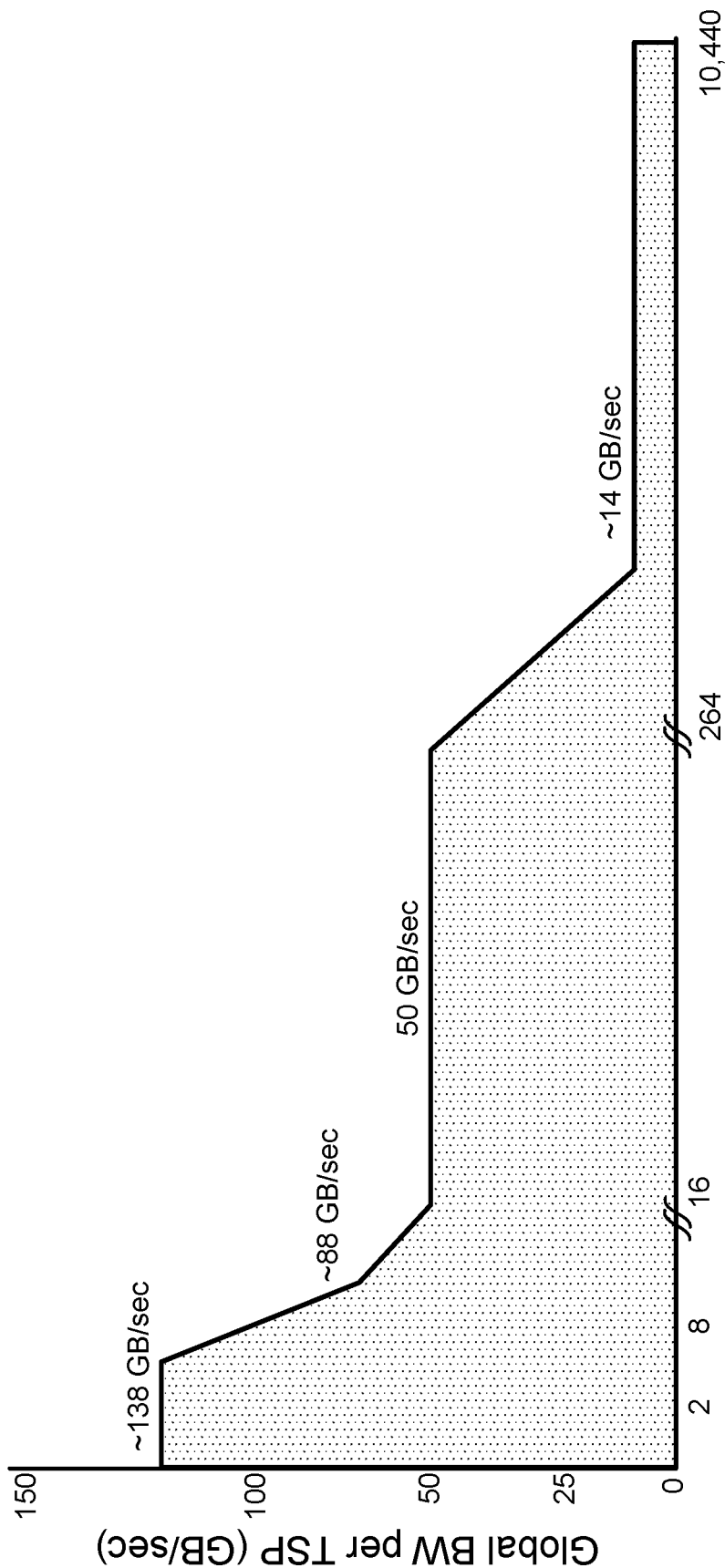
FIG. 6 illustrates an available global bandwidth profile per TSP, in accordance with some embodiments.

FIG. 6 illustrates an available global bandwidth profile per TSP, in accordance with some embodiments. The scalability or scale-out bandwidth is determined from the system packaging constraints which in turn drive the system's "bandwidth profile," which expresses the relationship between system scale (number of endpoints) and global bandwidth, and illustrates the bandwidth cliffs that may occur at each system packaging boundary. The bandwidth profile is similar to how a roof-line diagram may be used to convey the relationship between compute (arithmetic) intensity and memory bandwidth.

As shown in FIG. 6, in accordance with some embodiments, small systems with fewer than a threshold number of TSPs (e.g., 16 TSPs) can take advantage of abundant wire density within the node, while larger systems up to several hundred TSPs can take advantage of about 50 GB/sec of global (bisection) bandwidth per TSP. As system size grows beyond a threshold number of TSPs (e.g., 320 TSPs), the available global bandwidth flattens to about 14 GB/sec of global bandwidth per TSP endpoint. In some embodiments, a multi-TSP network is configured to deliver flat global bandwidth up to the maximum system configuration of 145 cabinets for a total of 10,440 TSPs.

Flow Control and Maintaining Determinism in a Distributed System

As a consequence of the deterministic network design, the hardware of the TSP system is disallowed from asserting back pressure, which would disrupt deterministic operation of the network. Instead, the TSP system utilizes software that explicitly schedules each physical link in the system, taking into account the channel bandwidth and latency of each channel to prevent overflow of the transmitter or underflow of the receiver. Specifically, as a tensor flows hop by hop through the network, the local SRAM storage on each TSP is used to provide intermediate buffering of the tensor's individual vectors. In this way, a vector is the flow control unit (flit) and each vector is transmitted at time is and is received at time $t_r$ on the other side of the link. Since the network path is fully deterministic, a tensor consisting of one or more vector flits can be scheduled using virtual cut through flow control, since the receiving TSP can immediately begin sending vectors to the next-hop of the tensor's path. The only exception to this is the flow control from the host processor's PCIe input channel to the TSP, where because of non-determinism induced by the PCIe link-layer retry mechanism, store and forward flow control is used to ensure the inputs from the host have arrived entirely before they are acted upon.

The collection of functional units on each TSP act as a single logical core which is scheduled statically at compile-time. This single-chip determinism is extended to a multi-chip distributed system, allowing for the global SRAM of the TSPs to be efficiently shared without requiring a mutex to guarantee atomic access to the global memory. Because the TSP hardware-software interface exposes all architecturally-visible states of the system (all SRAM, and stream registers), the static computation graph can be expressed as a series of dependencies that impose temporal deadlines on the operand arrival times of tensors being communicated. In some embodiments, these dependencies are expressed as a DAG (directed acyclic graph) to explicitly schedule the communication traffic, allowing for program correctness to be achieved by communicating explicit send or receive instructions at specific times, establishing a specific ordering of operations performed by the multi-TSP system.

In order to enable determinism by scheduling send or receive instructions at specific times in a multi-TSP system to satisfy imposed temporal deadlines, synchrony should be maintained between the TSPs of the system. In some embodiments, a multi-TSP system relies on three mechanisms to establish and maintain synchrony or plesiosynchrony, each of which is described in greater detail below: i) a per-TSP collection of hardware-aligned counters that are continuously (every 256 cycles) exchanged to maintain a global consensus time; ii) a procedure for initial program alignment that utilizes the links to ensure every TSP begins executing its instructions simultaneously; iii) a runtime resynchronization process to account for individual TSP clock drift during long-running computations. A summary of instruction set architecture (ISA) supporting these functions in enabling determinism across multiple nodes is shown in Table 1.

TABLE 1

| Name | Description |
|---|---|
| HAC | Hardware aligned counter |
| SAC | Software aligned counter |
| SYNC | Intra-chip pause instruction |
| NOTIFY | Intra-chip global signal to functional units to restart execution |
| DESKEW | Pause instruction until HAC overflows |
| TRANSMIT | Instruction to send notification to child through C2C link |
| RUNTIME_DESKEW t | Delay TSP for $t \pm \delta_t$ |

Hardware Aligned Counters (HAC)

In accordance with some embodiments, synchronizing a network of TSPs involves a combination of hardware and software mechanisms. In some embodiments, each TSP maintains a free-running internal hardware aligned counter (HAC) with a low (e.g., <256 cycle) overflow period, which is used to synchronize the TSP with other TSPs of the system. The HAC of the TSP increments at the frequency of the TSP's core clock, which may be derived from a source board-level clock. In some embodiments, the board clock of each TSP board within a node is based on a node clock generated by a node-level oscillator. However, drift between the core clocks of the TSPs of the node may cause the HACs of the TSPs to become misaligned. In addition, drift between the clocks of different nodes may cause further misalignment. In order to align the HACs of the TSPs of the multi-TSP system, a HAC exchange and adjustment operation is performed between pairs of TSPs of the system to establish plesiosynchrony between the TSPs, where the HACs of the TSPs serve as a "global" clock that allow for determinism to be maintained when transmitting data between different TSPs. In addition, the HAC exchange and adjustment operation is used to characterize latency of communication paths between pairs of TSPs, to provide knowledge of the multi-TSP system so that operations and communications can be accurately scheduled. In some embodiments, each hemisphere of a TSP may contain its own HAC.

FIG. 7A is a diagram illustrating a process of HAC exchange and adjustment between TSPs of a multi-TSP system, in accordance with some embodiments. When two TSPs (e.g., TSP0 and TSP1 having internal HAC values of HAC0 and HAC1, respectively) are connected via a point-to-point C2C link, the TSPs perform a HAC exchange operation to adjust and synchronize their respective HAC values. This HAC exchange serves as a mechanism for characterizing link latency by having a TSP transmit its current HAC value, then its peer reflects that value back. For example, as shown in FIG. 7A, when TSP0 and TSP1 are connected, TSP0 transmits 702 its internal HAC value at time t1 (HAC0(t1)) to TSP1. When TSP1 receives HAC0 (t1) from TSP0, it reflects 704 the same value back to TSP0.

When the reflected HAC value is returned to the originating TSP, it is compared with the internal free-running HAC, with the difference being the link latency (modulo a multiple of the HAC period). For example, as illustrated in FIG. 7A, the TSP0 receives the reflected value HAC0(t1) at a time t2, from which it determines a link latency measure L=[HAC0(t2)−HAC0(t1)]/2. This procedure is repeated until an acceptable confidence in the estimate of mean latency and variance within the system tolerance is achieved. For example, in some embodiments, the acceptable confidence may include a maximum spread of 17 core clock periods, a standard deviation within 2.5 to 3 core clock periods, and a mean-of-means across links with spread of less than 1.5 clock periods. As the latency of each link is tightly bounded and known at compile time, the compiler is able to treat these inter-TSP links as synchronous links (also referred to as deterministic links) for the purposes of scheduling instructions to the TSPs and coordinating the movement of data through the system in a deterministic manner. After a link is characterized in the manner described above, the two peer TSPs TSP0 and TSP1 with an observed latency with mean L are configured in a parent/child relationship such that the HAC maintained within TSP0 (i.e., HAC0) serves as the reference, and is periodically transmitted 706 to TSP1, e.g., at a predetermined frequency. When the instantaneous value of HAC0 is received by TSP1, its value plus the latency L is compared to that of HAC1. The difference represents initial misalignment along with continual clock drift. For example, as shown in FIG. 7A, TSP0, at time t3, transmits its HAC value (HAC0 (t3)) to TSP1, which receives it at time t4, whereupon the TSP1 determines a misalignment amount HAC1(t4)−[HAC0(t3)+L]. The TSP1 adjusts the value of HAC1 to reduce the difference. In some embodiments, TSP1 adjusts the value of HAC1 up to a maximum adjustment rate, where the maximum adjustment rate may be configurable. In some embodiments, after a sufficient number of iterations of this process (which may be approximately bounded by the period of the HAC counters), the two counters HAC0 and HAC1 will converge within a neighborhood determined by the jitter of the link latency. Thus, this protocol determines a common periodic reference for two TSPs. In some embodiments, to expand this protocol to a network of TSPs, a spanning tree of parent/child HAC relationships is established to maintain a common HAC reference time distributed across the network. For example, a TSP of the network may serve as a child TSP to a first TSP, and a parent TSP to a second TSP, for the purposes of HAC alignment, in accordance with the established spanning tree. This HAC alignment operation is performed periodically for each pair of TSPs, allowing for the HACs of the TSPs in the system to function as a "global" clock for the system. Even though the HACs of different TSPs may be tied to different clock domains (e.g., the HACs of TSPs of different nodes may be operated based upon clocks established by different node-level oscillators), these operations ensure convergence of the HACs, allowing for plesiosynchronous operations between different TSPs of the system.

In some embodiments, the HAC alignment procedure serves as the foundation upon which the synchronous distributed system is programmed, by allowing for software-controlled ISA support for a common software clock reference. For example, in some embodiments, a single TSP achieves deterministic scheduling of multiple functional units of the single TSP by using a SYNC instruction to "pause" issue from the independent instruction streams for the various units, followed by a single functional unit issuing a NOTIFY instruction that in turn results in a global control signal (with known latency) to be delivered to the paused functional units, causing them to restart execution on the same clock cycle. This NOTIFY thus serves as the software-controlled time reference upon which all other static scheduling for the TSP is derived. By aligning the HACs of the TSPs in the multi-TSP system, similar operations can be performed to achieve deterministic scheduling of multiple functional units on multiple different TSPs, which will be described in greater detail below.

Initial Program Alignment

As discussed above, synchronization for a single TSP relies on a shared clock and a fully-deterministic propagation path. In some embodiments, through the use of a common (periodic) HAC reference to simulate a shared clock, similar functionality can be achieved in a multi-TSP system.

In some embodiments, a DESKEW instruction is used to align program execution on a TSP of the multi-TSP system with the TSP's (local) HAC. When a functional unit executes a DESKEW instruction, it pauses issuing subsequent instructions on that functional unit until the next time the HAC overflows, which may be referred to as an epoch boundary. This ensures that, in a multi-TSP system, distributed computation performed by multiple different TSPs can begin relative to a HAC epoch boundary, which, as discussed above, through HAC alignment, may reflect a shared reference time among TSPs in the network.

FIG. 7B is a diagram showing HAC-based synchronization procedure utilizing DESKEW instructions in a multi-TSP system, in accordance with some embodiments. At time t1, the child device TSP1 is locally placed into a polling synchronization loop 710, comprising a Recv, Gather, IFetch, and Deskew instruction executed in sequence. In the polling loop, at each epoch boundary (annotated by HAC=0), the child device TSP1 attempts to receive a vector from the parent device TSP0. If that vector has not been transmitted yet, the loop 710 will continue.

At time t2 a parent program on the parent device TSP0 is invoked that performs a DESKEW followed by a TRANSMIT. Though the events t1 and t2 are unsynchronized, the use of DESKEW forces alignment of the subsequent instruction with the shared HAC value (e.g., HAC0 and HAC1, synchronized using the HAC alignment procedure described above). The TRANSMIT 712 from the parent device TSP0 happens at an epoch boundary after time t2, and the vector arrives at the child device TSP1 at some time t3. This vector will be consumed by the RECV instruction that will issue on the child device TSP1 following the next epoch boundary following t3, causing the child device to exit the synchronization loop at some fixed number of epochs following the transmit from the parent to child device, e.g., at time t4. Finally, both the parent and child devices will begin synchronized computation at time t4, e.g., by issuing a (chip-local) NOTIFY instruction at time t4. Because the link latency between the parent and child devices is known at program compile time (e.g., using HAC exchange and adjustment operation described above), the parent device may be scheduled to issue its NOTIFY instruction a set number of epochs following the issuance of the TRANSMIT 712, so that the instruction is issued at the same epoch boundary (e.g., at time t4) as that of the child device, to ensure synchronous operation of the system such that computation on the different devices of the system can proceed in a deterministic manner.

The synchronization process illustrated in FIG. 7B will take $\lfloor L/period \rfloor+1$ clock epochs (where period is the epoch length, which in some embodiments may be 252 clock cycles) after the beginning of the epoch in which the TRANSMIT was issued, where L is the latency of the parent to child link. To support scaling to larger diameter networks, the system incorporates the DESKEW-based synchronization process repeatedly along each hop of the HAC spanning tree, with an overall synchronization overhead of $(\lfloor L/period \rfloor+1) \times h$ total cycles, where L the maximum single-link latency and h is the height of the notification spanning tree. In some embodiments, this initial program alignment operation is only performed at the start of a distributed inference, and a separate runtime resynchronization process to adjust for clock skew during program execution is performed during runtime, which is described in greater detail below.

Runtime Deskew for Resynchronization

While the HAC-based initial program alignment scheme described above allows the establishment of a common starting time reference for a multi-TSP system, inter-TSP drift may occur during runtime, due to frequency uncertainty of the various independent TSP clocks. In some embodiments, in order to account for this inter-TSP draft, each TSP provides an additional software aligned counter (SAC) mechanism to allow the TSPs to re-synchronize during computation in a way that keeps accumulated drift within allowable tolerances. In some embodiments, the SAC is a free-running counter with the same period as the HAC. However, unlike the HAC, the SAC is not updated to correspond with upstream HAC peers, but rather continues to freely count local clock cycles. The delta between a TSP's SAC and HAC thus represents the accumulated drift of the "local" view of time (represented by the SAC) since the last synchronization and the "global" view of time (represented by the HAC).

In some embodiments, to reconcile the local versus global time in the multi-TSP system, a RUNTIME DESKEW instruction is provided in the ISA of each TSP of the multi-TSP system that takes a single parameter t indicating a target number of clock cycles to stall. When executed, the TSP delays for the target number of cycles t plus or minus ($\delta t$, which corresponds to the signed difference of the TSP's HAC and SAC. In some embodiments, the current value of ($\delta t$ is determined when the RUNTIME_DESKEW instruction is executed. In the event that ($\delta t$ is positive, the "local" time represented by the SAC is faster than the "global" time represented by the HAC, and the TSP will stall for the target number of cycles t plus $\delta t$. Similarly, if $\delta t$ is negative, the "local" time represented by the SAC is slower than the "global" time represented by the TSP's HAC, and the TSP will stall for the target number of cycles t minus the magnitude of $\delta t$. In this manner, the "local" time is re-aligned with the "global" time, the multi-TSP system is re-synchronized, and the accumulated global error is reduced to the link jitter. In some embodiments, this RUNTIME_DESKEW instruction is scheduled to be executed on each TSP within the network at the same time. While it is executing, the other functional units on each TSP are expected to be quiesced using the single-chip SYNC mechanism, and subsequently awoken via a local NOTIFY. In some embodiments, the RUNTIME_DESKEW instruction is scheduled to be executed on each TSP periodically. In some embodiments, a frequency at which the RUNTIME_DESKEW instruction is scheduled on each TSP is configured to be less than a frequency at which HAC alignment is performed on the TSP.

Thus, in some embodiments, global time across the system is maintained through a combination of hardware support (local to each TSP) and software support using a system-wide "synchronization" task which uses a spanning-tree to visit each TSP in the system to account for any drift relative to the reference time on the root of the spanning tree.

Reliability in a Deterministic Network

Many point-to-point networks like PCIe employ a link-layer retry (e.g. a sliding-window retransmission protocol) to replay packets at the link-layer, so that errors are not observed by the network or application layers. However, such functionality is not suitable in a deterministic network such as a multi-TSP system, as the link-level retry mechanism also introduces non-deterministic behavior, since it changes the expected arrival time of the retransmitted packets, thus interfering with the global synchronization of the system. In some embodiments, in order to maintain determinism in a multi-TSP system in the face of transmission errors, forward error correction (FEC) is used to correct simple transmission errors and detect uncorrectable burst errors, keeping the collection of point-to-point physical links deterministic between any source-destination TSP pair in the system. During runtime, packets are routed hop by hop through the network, where any transmission errors are corrected in situ, and any critical errors are flagged.

In some embodiments, critical errors may correspond to errors that require the runtime system to "replay" the inference (e.g., a software replay) to determine if the fault is transient and disappears after replaying the inference, or persists after a retry and requires physical intervention (e.g., to replace a marginal cable, power supply unit, or TSP card) to remedy the fault. For example, in some embodiments, computation performed by the multi-TSP system is divided into a plurality of phases. In some embodiments, each phase is treated as an atomic inference, and the TSPs of the system are configured to output intermediate data to a host system (e.g., connected via a PCIe bus, ethernet network interface card, and/or the like) that allows for the host system to preserve the overall runtime state corresponding to the beginning of each phase, e.g., as a checkpoint. During execution, if a TSP of the system detects a critical error, this error is signaled to the host system, which halts the currently-executing phase, and stores the state of the system to that of the previous checkpoint, and restarts execution of the phase. If, during the rerun, no critical errors are detected, data indicating the resulting system state is output to the host system to establish a new checkpoint.

The scale of a parallel computer, as measured by the maximum number of processing elements in the system, is in a very practical sense limited by the reliability of the system. In some embodiments, the TSP processing elements of the multi-TSP system use a deterministic datapath and error correction of all single-bit errors (SBEs) which are corrected in situ by the TSP hardware, and detect all multi-bit errors (MBEs) so that the runtime software can replay the inference on a set of known good hardware if and when a critical error is identified.

In some embodiments, the multi-TSP system uses N+1 redundancy by provisioning a hot spare node in every deployed rack. For example, as illustrated in FIG. 4, each rack may comprise N+1 nodes (e.g., nine nodes), which include N active nodes and one spare node (e.g., eight active nodes and one spare node). Because the topology of the system is both edge and node symmetric, the network remains fully-connected (i.e., there is a path between every source-destination pair in the system) even when the spare node is used in lieu of one of the active nodes. This strategy allows for the system to monitor system health at runtime, and replace any unusable nodes with the spare node as the runtime layer marshals resources for invoking the parallel program's execution. In some embodiments, this overhead can be reduced by provisioning a redundant node per system such that, for example, a 33 node system with four racks would have 1 of 33 nodes as the spare (reducing the overhead from 11% to 3%, leaving 32 nodes (256 TSPs) for executing the parallel program.

By provisioning a hot-spare node and providing a software replay mechanism, the multi-TSP system is able to gracefully recover from a critical fault by having the runtime replay the inference. In addition, critical errors are mitigated through the use of FEC on the network links and single-error correction and double-error detection (SECDED) extensively throughout the TSP's memory system, data paths, and instruction buffers.

Software-Scheduled Networking (SSN)

A foundational characteristic of the TSP architecture is its deterministic data paths. In some embodiments, this determinism is achieved by the removal of all reactive elements such as arbiters, caches, or other components which could otherwise permute the ordering of remote references. Additionally, because execution latency of all instructions is known statically (at compile time) and therefore exposed to the compiler via the ISA (instruction set architecture), the ISA is not providing an abstraction of the hardware, but instead provides the means by which software exerts control over the underlying hardware. This enables the compiler to achieve cycle-accurate scheduling, allowing the compiler to know the exact number of cycles needed to execute any given program using "software-defined hardware." The hardware of the system extends the guarantee of deterministic execution from a single TSP to a multi-TSP network. Achieving this determinism across the full network allows the compiler to not only have cycle-accurate knowledge of all data movement within a single TSP, but also across the links connecting the network of TSP processing elements. The exact timing (in cycles) to inject a vector at the source TSP, as well as the exact cycles data will arrive at a destination TSP, is resolved at compile time. This networking paradigm may be referred to as software-scheduled networking (SSN) since it replaces the notion of dynamically routing packets as they flow in the network, with scheduling tensors at compile time. Through the use of SSN, the multi-TSP system explicitly schedules and routes communications between the TSPs of the system. In addition, because the communication pattern for executing the computations to be performed by the system is known at compile time, the compiler is able to schedule the communications such that data is delivered to the appropriate TSPs at the appropriate time without an explicit request communication, and routed in a manner that takes advantage of the path diversity of the system to reduce congestion and deadlock.

FIG. 8A is a diagram illustrating communication between a pair of processors in a conventional network. FIG. 8B is a diagram illustrating communication between a pair of TSPs in a multi-TSP system, in accordance with some embodiments. In conventional networks, as shown in FIG. 8A, in a simple remote transaction in which Processor A is to receive data from Processor B, Processor A first sends a Read request message 802 (indicating "read the value of address X from processor B and reply to processor A"), which upon receipt, processor B, issues a DRAM read 804 based on the received read request, and sends the resulting reply 806 back to processor A, incurring one round-trip of network latency.

On the other hand, with a software-scheduled networking approach, as shown in FIG. 8B, TSP B is scheduled to read 810 data containing a vector (X) from its local memory (e.g., SRAM memory), and to send 812 the data containing vector(X) at a specific time to the expectant TSP A at a specific time as specified by the compiled program, without needing to receive a request for the data from TSP A beforehand. By eliminating the "request" leg of the protocol traffic, the number of network requests needed to complete the transfer of data is reduced. In addition, a functional unit of the TSP A is scheduled to receive 814 data from a specific stream at a specific time, which, as scheduled by the compiler, will correspond to the sent data vector(X). In this way, the TSP A is able to execute a "remote read" on another TSP in the system, where, from a programming model perspective, the source of the received tensor data (e.g., from local memory or remote memory) is irrelevant. Also, because the TSP A does not need to transmit a request for vector (X) to TSP B, but instead only needs to be scheduled to read data arriving on a specific stream at a specific time, the TSP A may be scheduled to perform other computational tasks instead of waiting for the requested data to arrive. This overlap of computation and communication serves to reduce the impact of communication latency on the overall system.

SSN differs from "software-defined networking" (SDN) techniques such as Open Networking Foundation's (ONF) OpenFlow which introduces programmability to hardware components, allowing them to react and adapt to network conditions on-the-fly. While SDN can enable more predictable communication, the multi-TSP network uses system-wide determinism to deliver quality of service (QoS) guarantees so that the end-to-end latency service level agreements (SLAs) are attainable. In SDN, software is used to dynamically adjust the algorithms that networking hardware follow in order to alleviate resource congestion. On the other hand, in SSN all contention for resources have been resolved at compile-time. Thus, the need for adaptive hardware has thus been removed—arbitration, back pressure, deadlock avoidance and recovery hardware are no longer necessary since dynamic contention for hardware resources will never happen. Additionally, data no longer needs to be encapsulated into packets and messages in order to traverse the network. Instead, all information about data movement has been encoded in the instruction streams produced by the compiler, allowing for the data to be transmitted as vectors or tensors, without the need for additional packet headers/footers. In some embodiments, a ML model's static computation graph and a priori knowledge of the traffic pattern is used to enable an alternative scheme for routing tensors as a collection of back-to-back vectors which are the flow control units (flits) within the network. This provides fine-grained (320 byte) communications between TSPs by extending this single-chip determinism to the entire network of TSPs and lays the foundation for scheduling tensors precisely to the clock cycle across the network links.

Routing Versus Scheduling

Due to the deterministic nature of the multi-TSP system, the compiler is able to schedule the transmission of data through various paths within the multi-TSP system at compile time, instead of the system determining the routing of messages through the network at runtime. In traditional network routing, routing algorithms are used to determine the path a message takes through the network, where the routing function is commonly implemented in hardware using lookup-tables to provide a simple output-port mapping for each incoming packet by inspecting the packet's destination node. In comparison, a multi-TSP system explicitly controls and schedules the hop-by-hop path through the network by orchestrating a sequence of send and receive instructions on the source and destination nodes, respectively. Given that all data movement can be statically inferred, the compiler orchestrates data movement based on global information across time and space to eliminate conflicts for shared output ports.

Figure 9B:
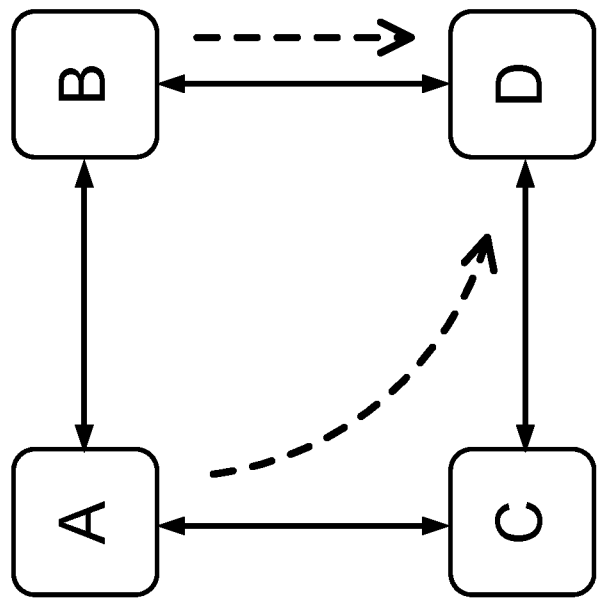
FIGS. 9A and 9B show an example of traditional routing in a non-deterministic network in comparison to the scheduling of paths using SSN, in accordance with some embodiments.
Figure 9A:
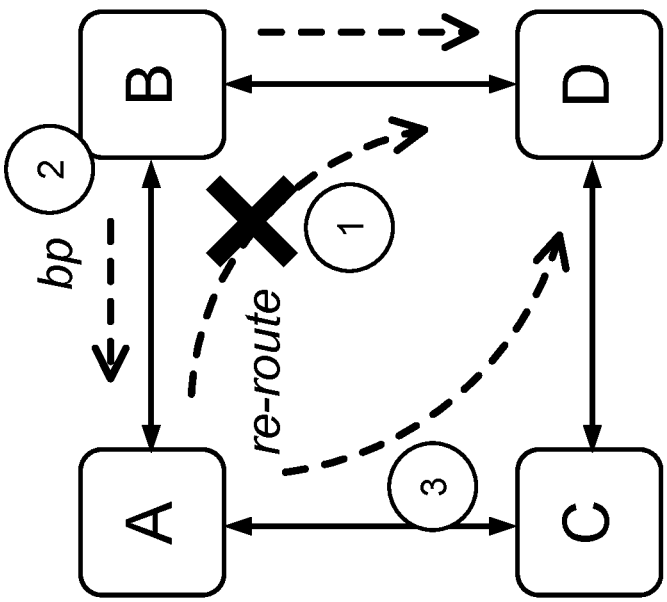

FIGS. 9A and 9B show an example of traditional routing in a non-deterministic network in comparison to the scheduling of paths using SSN, in accordance with some embodiments. As shown in FIG. 9A, in a network using traditional routing techniques, in a scenario where both TSP A and TSP B are to send a message to TSP D, contention for the shared link from TSP B to TSP D may occur. For example, in the network shown in FIG. 9A, TSP A has two minimal route options: two hops via TSP B or two hops via TSP C. Without awareness of TSP B's downstream congestion, TSP A's local algorithm may choose the path via TSP B, where taking this route would result in TSP B asserting flow control to back-pressure TSP A. Once the backpressure signal has propagated back to TSP A, it can then either wait for the route to become free (and thus incurring a performance hit) or re-route the data via an alternate path. This reactivity resulting from arbitration and backpressure not only adds complexity to the hardware but also adds latency to the communication. It can also result in packet reordering in the network which introduces complex message-level reassembly at the endpoints.

On the other hand, in a multi-TSP architecture using SSN, such as that shown in FIG. 9B, this decision-making step is moved from hardware into the compiler where it can schedule data movement across the network by avoiding contention for the output port on each hop of the path. For example, the compiler, having a priori knowledge how data is to move across the network, resolves the potential contention between from TSP A and TSP B to TSP D by routing the messages along alternate routes through the system, eliminating the need for adaptive hardware to deal with resource contention at runtime.

Path Diversity and Route Selection

In accordance with some embodiments, the multi-TSP system uses "non-minimal" routing that takes advantage of abundant path diversity exhibited by the Dragonfly-based hierarchical topology of the system, to spread the offered traffic across multiple injection links in each TSP. This functions to "load balance" the global network links based on the offered load (tensor size) and precise scheduling of the individual vectors (flits). By deterministically spreading the offered load across multiple links, end-to-end reordering of hardware-based adaptive routing can be avoided. For example, unlike in hardware-based adaptive routing, the communication pattern of the multi-TSP system, both in space and in time, is known a priori to the communication itself. As a result, an optimal routing decision can be made during compile time based on the traffic pattern. In addition, prior knowledge of the communication pattern enables the compiler to perform deterministic load balancing by spreading offered traffic across available physical links to increase the throughput and reduce the observed message latency. Since the traffic pattern is known entirely at compile time, the user and/or the compiler can leverage the abundant path diversity of the multi-TSP system to deterministically schedule a tensor (message) along its path from the source to destination.

In addition, non-minimal routing can be exploited to provide more bandwidth in communication between source and destination TSPs. For example, in some embodiments, when scheduling the transfer of data from a first TSP to a second TSP within a particular node, the compiler may schedule the data to be transferred via a direct C2C link between the first and second TSPs, and/or schedule the data to be transferred via one or more non-minimal routes, e.g., over links that pass through a third, intermediate TSP. Where an amount of data to be transferred exceeds the capacity for a given link, the compiler, having complete knowledge of the system topology as well as a complete view of the state of the network during each cycle, may select one or more non-minimal routes in addition to or instead of a direct route through which to route data from the first TSP to the second TSP. In some embodiments, the compiler may divide the data to be transferred into a plurality of subsets, and transfer each subset of data along a separate route to the second TSP, to maximize the utilization of available bandwidth. For example, for the node 404 shown in FIG. 4, to transfer a large amount of data from TSP1 to TSP2, the compiler may schedule the transfer of subsets of the data to other TSPs of the node (e.g., from TSP1 to TSP3, TSP4, and TSP5), and then schedule instructions at each of the other TSPs to route the data to TSP2 via respective C2C links (e.g., from TSP3, TSP4, and TSP5 to TSP2). This "fan-out" and "fan-in" of the data allows for additional bandwidth (if available) to be utilized for transferring data to TSP2, allowing for the transfer of data to be completed in a more timely manner, despite the increase in path lengths of the individual routes. It is understood that these techniques may be extended to routes with additional hops (e.g., involving additional intermediate TSPs), as well as beyond the node level (e.g., non-minimal route selection and scheduling for transferring data between TSPs of different nodes).

In some embodiments, scheduled non-minimal routing may facilitate the use of a large number of TSPs in the system as contributing to shared global memory, even when computation is performed by a smaller subset of the TSPs. For example, in some embodiments, the host system loads data (e.g., model data) onto a plurality of TSPs of a multi-TSP system (e.g., via respective PCIe interfaces of the TSPs), where, during computation, model data is streamed between the plurality of TSPs to specific TPSs (e.g., a subset of the plurality of TSPs) on which computation is performed, via synchronous links between the TSPs. Individual TSPs are thus able to utilize data from the entire shared global memory of the plurality of TSPs. In addition, by loading model data from the host system onto a large number of TSPs, initial loading time is decreased due to the greater amount of available bandwidth between the host system and the plurality of TSPs (e.g., due to additional interfaces between the host and TSPs being available for loading data).

In accordance with some embodiments, in contrast with hardware-based topologies, the "routers" of a multi-TSP system implemented as a software-scheduled network are effectively "endpoints" that are injecting traffic into the system, e.g., as shown in FIG. 3C. As such, the amount of bandwidth injected is no longer limited by the injection bandwidth, but by the switch router bandwidth, which also impacts non-minimal routing. In a hardware-defined system, if there is no congestion (or contention) for the minimal path, all packets are routed minimally. However, when network congestion is sensed, routing may avoid minimal paths and route non-minimally, to use an otherwise under-utilized path with the goal of reducing latency and improving overall throughput. As a result, in a hardware-defined system, if only a single source and a single destination are communicating, non-minimal routing may not be not necessary since an injection channel cannot oversubscribe a single network channel. However, in SSN, non-minimal routing can be exploited to provide higher amount of bandwidth between the source and destination TSPs.

Software-scheduled routing still entails a "decision" to be made to determine whether packets should be routed minimally or non-minimally. However, instead of making routing decisions dynamically on a per-packet basis using congestion information available in the router, the routing decision is relegated to the compiler, which uses the local information to schedule the network links optimally. For example, in some embodiments, the tensor's physical data volume (i.e. the product of a tensor's dimensions H×W×C) is used as the data volume being communicated, and based on the tensor size, the compiler selects the number of links to spread the traffic across.

Figure 10:
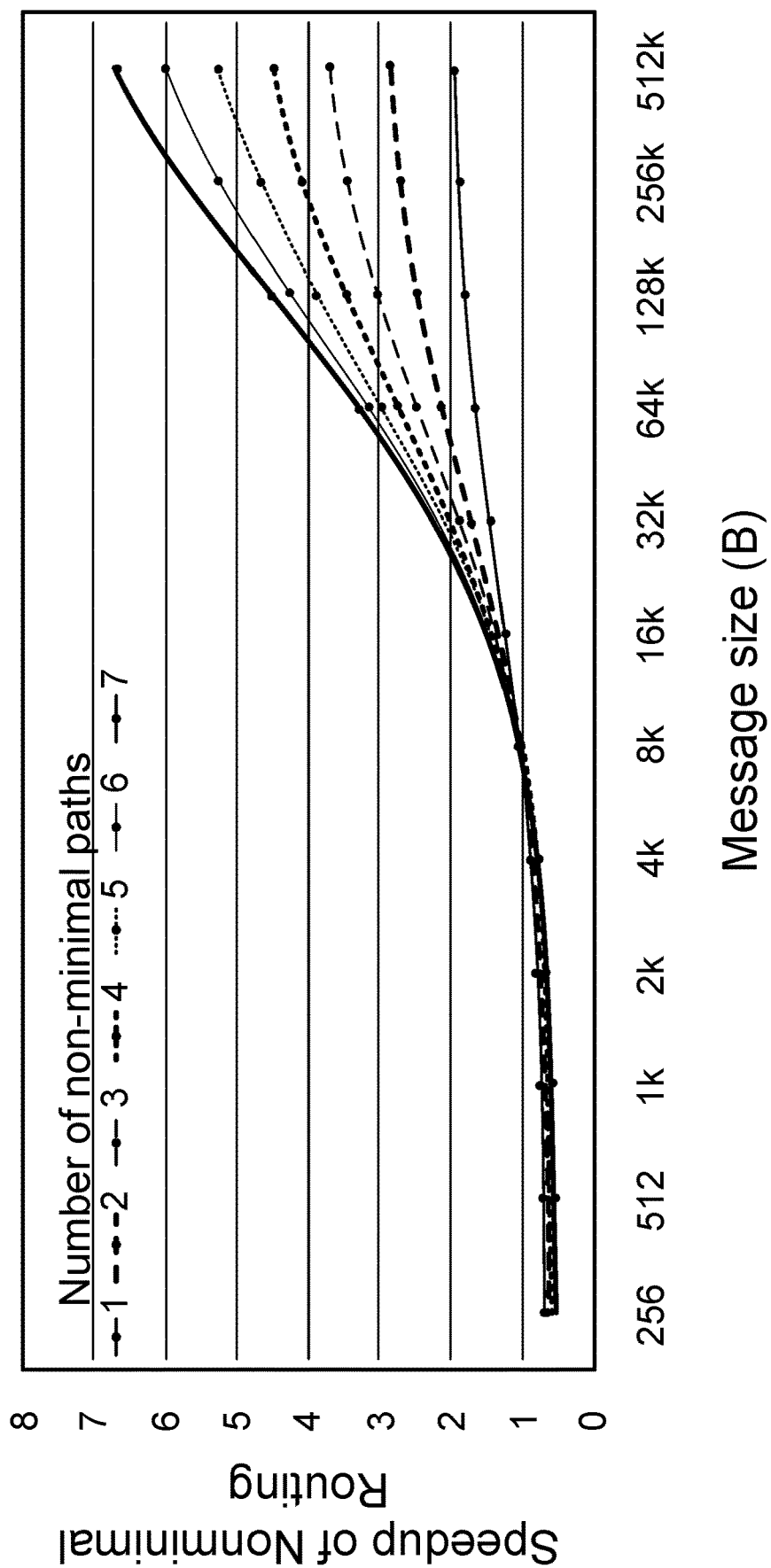
FIG. 10 is a graph showing an example of performance benefits of non-minimal routing in relation to message size and number of non-minimal paths within a TSP chassis of a multi-TSP system, in accordance with some embodiments.

FIG. 10 is a graph showing an example of performance benefits of non-minimal routing in relation to message size and number of non-minimal paths within a TSP chassis of a multi-TSP system, in accordance with some embodiments. The example shown in FIG. 10 assumes an optimal distribution of minimally- and non-minimally routed messages such that overall latency for communication is minimized. For example, in some embodiments, for a message size smaller than a threshold size (e.g., 8 kB), there is no benefit of non-minimal routing. However, for larger message sizes, the benefit of non-minimal routing gradually increases and the benefit of more bandwidth (or a greater number of non-minimal paths) provide higher benefit for larger message size. The actual crossover point on the benefit of non-minimal routing is a function of the message size, the number of non-minimal paths, and per-hop latency.

To enable SSN, the multi-TSP system does not allow for dynamic arbitration, as it would result in non-determinism and make it impossible for the compiler to explicitly schedule and pace every link. In some embodiments, virtual channels (VCs) are used to avoid routing deadlock with non-minimal global adaptive routing and guarantee circular dependencies do not occur. With software-scheduled routing, circular dependencies between packets can still occur. In traditional network routing, routing deadlock is fundamentally caused when packets hold on to a resource (e.g., buffer or VC) while requesting another resource (e.g., downstream buffer). On the other hand, with software-scheduled networking, because packets or messages are scheduled in advance, the packets do not hold on to the resource while requesting another resource and routing deadlock cannot occur. Similarly, toroidal deadlock scenarios arise in torus networks due to overlapping VC dependencies around the torus links. For example, FIG. 4 illustrates a node 410 implemented as a radix-8 torus, in accordance with some embodiments. The local group radix-8 torus topology enables efficient nearest-neighbor communication with adjacent TSPs for inference using pipelined model parallelism. With a radix-8 local group topology, triple-connected physical links within the torus increase nearest-neighbor throughput. These links further serve as a "dateline" across with which any overlapping virtual channel dependencies that arise during scheduling the physical links of the network can be physically isolated. In effect, the physical links are used as a virtual channel to provide the same isolation benefit and break toroidal cycles.

Figure 11:
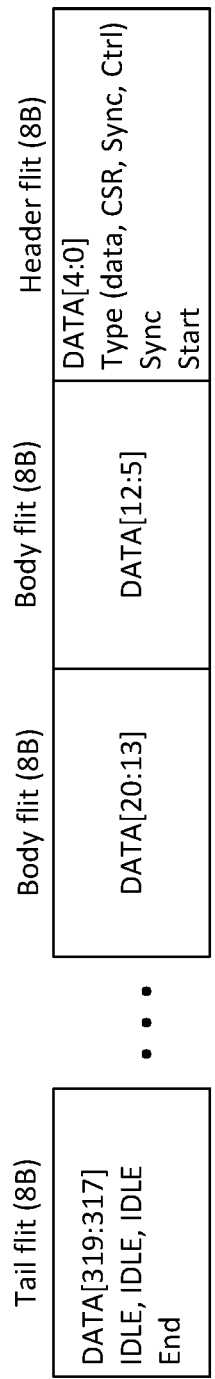
FIG. 11 illustrates the packet format of a 320-byte vector used in a multi-TSP system, in accordance with some embodiments.

In accordance with some embodiments, by explicitly scheduling the communication of data between the functional units of a TSP and between different TSPs of a multi-TSP system and eliminating hardware flow control, the communicated data may be in the form of tensors or vectors, and does not need to be encapsulated into packets or messages in order to traverse the network. Instead, all information about data movement is encoded in the instruction streams produced by the compiler, separate from the data. FIG. 11 illustrates the packet format of a 320-byte vector used in a multi-TSP system, in accordance with some embodiments. As shown in FIG. 11, because the vector does not need to contain information indicating the intended data movement of the vector, a high coding efficiency (e.g., 97.5%) for each vector can be achieved.

Traffic Patterns of The Multi-TSP System

In some embodiments, the traffic pattern within the multi-TSP system is an emergent property of the underlying ML model, and how the model is partitioned to take advantage of model parallelism (i.e., distributing different layers across the TSPs of system) and data parallelism to exploit mini-batch parallelism across the cluster. The multi-TSP system exploits the abundant path diversity of the system's topology, by deterministically spreading the offered traffic across the available links. For example, the multi-TSP system spreads the vectors (e.g., 320-byte vectors) of a larger tensor across the C2C links in the path between the source and destination TSP.

In some embodiments, the compiler automates model decomposition, to auto-scale the workload across a desired number of TSP elements. The compiler partitions the workload into smaller sub-tasks and maps the sub-tasks to individual TSPs responsible for executing them. This mapping process induces the traffic pattern for the parallel workload. For pipelined model parallelism, the precise execution time of each pipe stage's sub-task and exchange activations between the layers of each stage are computed at compile time. Because the exact execution time of each stage (to the clock cycle) is known, dynamic profiling to extract the run-time characteristics of the sub-tasks is not needed. This makes the parallel decomposition step precise and explicitly under control of the compiler which can, in turn, make tradeoffs to change the ratio of compute to communication time (e.g., controls the surface-to-volume characteristics of the parallel workload). For example, the compiler may schedule communications to overlap with computation as much as possible, effectively hiding the C2C link latency.

In some embodiments, the model is decomposed such that sub-tasks that are tightly-coupled are assigned to nearby TSPs. For example, sub-tasks that operate on a common large volume of data may be assigned to TSPs within a common node, reducing an amount of latency introduced by inter-TSP communication and eliminating potential bottlenecks. In some embodiments, the compiler identifies one or more "pinch points" within the model, corresponding to portions of the model with a reduced volume of communication, and distributes computational operations performed on different sides of the pinch points to different parts of the network (e.g., to different nodes, different racks, etc.). For example, in some embodiments, a pinch point may correspond to different stages of a model where data is accumulated and reduced in order to be passed to a next stage of the model.

Software Stack

Figure 12:
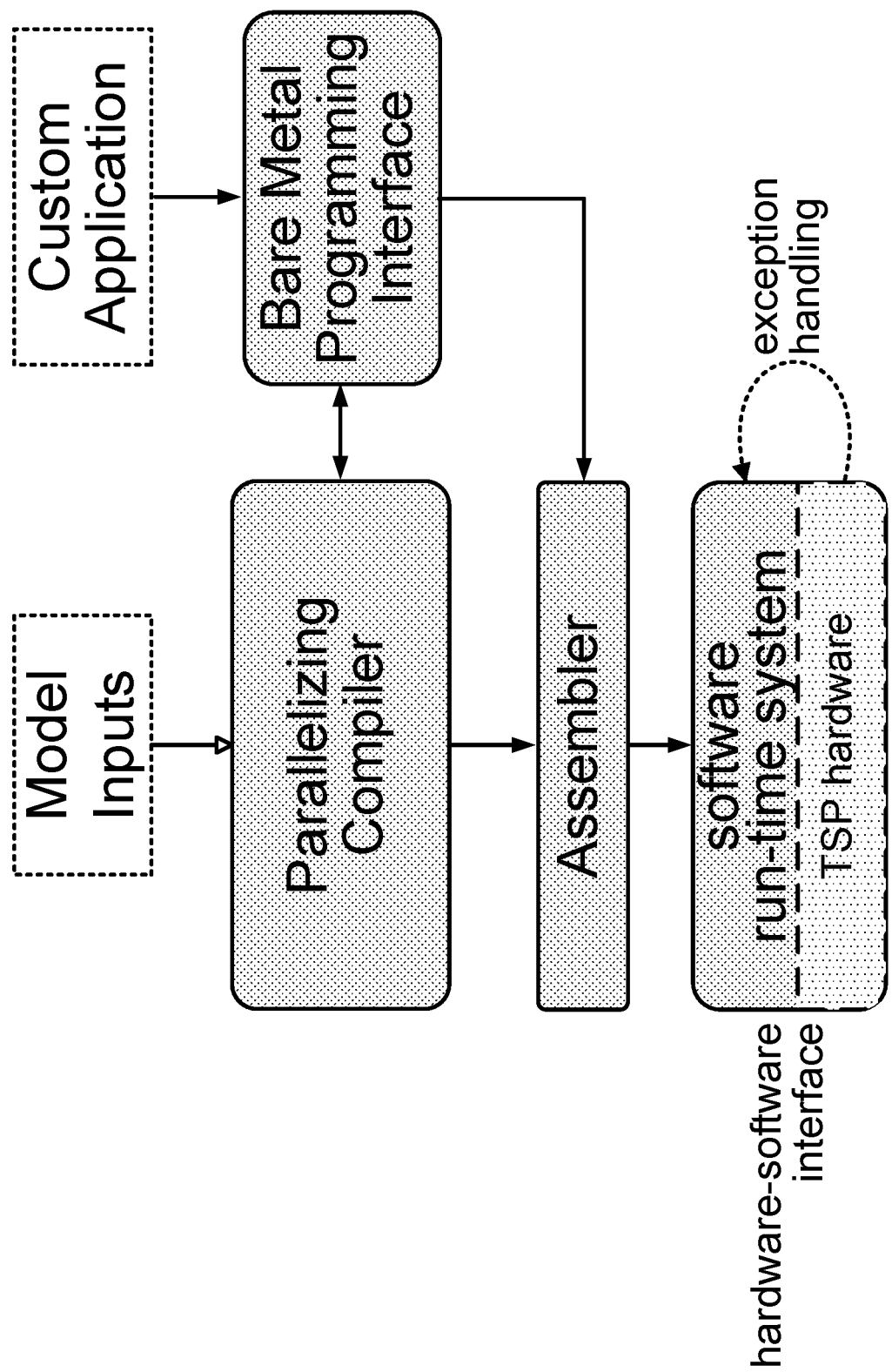
FIG. 12 is a diagram illustrating different abstraction layers of the hardware-software interface and software stack used by a multi-TSP system, in accordance with some embodiments.

FIG. 12 is a diagram illustrating different abstraction layers of the hardware-software interface and software stack used by a multi-TSP system, in accordance with some embodiments. As shown in FIG. 12, the different layers of the software stack may have different primary design entry points, including model inputs such as PyTorch, TensorFlow, and/or the like, or a custom application on top of a bare-metal programming interface. In some embodiments, both the bare-metal API and the compiler share the same assembler and runtime stack, where the scheduled program is passed to the assembler to generate a machine-code binary that is then run on the TSPs of the multi-TSP system. In some embodiments, when targeting multiple TSPs, the input model may be automatically partitioned by the compiler or manually by the programmer, and an individual TSP binary is compiled and prepared for each TSP in the system. The runtime system then emplaces all program collateral on the TSP endpoints and synchronizes all programs (e.g., as described above), so that the inference operations are launched simultaneously across all cooperating TSPs of the system.

Distributed Matrix Multiplication

Examples are discussed below in relation to performance of matrix multiplication by a multi-TSP system, in accordance with some embodiments. Matrix operations like vector-matrix and matrix-matrix multiplication are workhorses of ML models. Different approaches may be used to map matrix workloads (e.g., [M×N]×[N×L]) onto multiple TSPs. For example, in some embodiments, matrix multiplication may be performed using column-wise weight splits where the second matrix ([N×L]) is split equally column-wise across multiple TSPs, and the final results are then concatenated together. Alternatively, row-wise weight splits where the second matrix [N×L] is split equally row-wise across multiple TSPs and the first matrix ([M×N]) is split column-wise, where the final result is the reduction of all the partial product matrices produced by each TSP, may be used. In some embodiments, for single chip, the compiler decomposes a matrix multiply into [1×K]×[K×n] sub-operations (where n and K may be based on the type of data values, e.g., where n=320 and K=[160, 320], i.e., the vector lengths of the hardware for fp16 and int8 respectively). Additionally, a TSP can run two fp16 or four int8 sub-operations each cycle.

Figure 13:
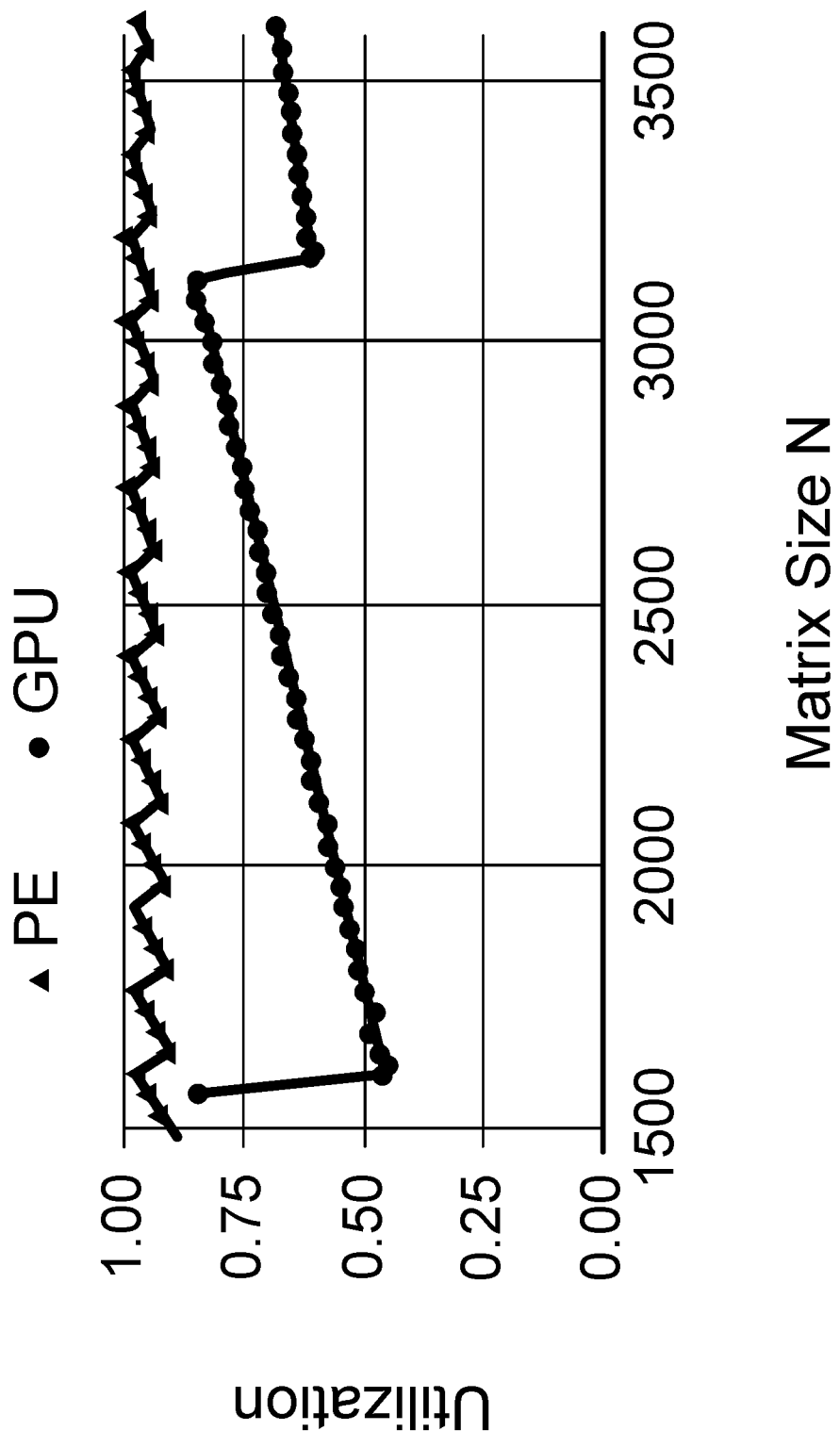
FIG. 13 illustrates a graph showing utilization of Pes for matrix multiplication operations with different matrix sizes, for a multi-TSP system and for a multicore system implemented using conventional GPUs, in accordance with some embodiments.

FIG. 13 illustrates a graph showing utilization of PEs for matrix multiplication operations with different matrix sizes, for a multi-TSP system and for a multicore system implemented using conventional GPUs, in accordance with some embodiments. Results shown in FIG. 13 compare the achievable utilization of the TSP and a conventional GPU when computing the matrix operation [2304×4096]×[4096×N], for N=[1376, 3500]. As shown in FIG. 13, the multi-TSP system is able to achieve at least 73% utilization consistently at different matrix sizes on the TSP, which contrasts with conventional GPU architectures. Using a combination of column-wise and row-wise weight splits, large matrices can be further decomposed and run on multiple TSPs to minimize the overall latency of the operation.

In some embodiments, large matrices are decomposed amongst several TSPs using column-wise and row-wise weight splits. For example, to decompose a [800×32576]×[32576×8192] operation, in accordance with some embodiments, the operation may be first divided into eight (8) sub-operations using column-wise splits (e.g., eight [800×32576]×[32576×(8192/8)] operations). The operations may be further divided using row-wise splits, e.g., of the form [800×(32576/N)]×[(32576/N)×(8192/8)] where N=[1, . . . 13], to be decomposed onto additional TSPs. In some embodiments, the compiler or user attempts to cluster row-wise splits in a single node to leverage the topology of the system. In some embodiments, a reduction is applied within a node on all the partial results (with 8 TSPs) to create one [800×(8192/8)] result per node. In addition, if needed, the result on each node is reduced and transferred with one of its neighboring nodes over C2C until eight 800×(8192/8) results are produced, which are concatenated together to form the final [800×8192] result.

Figure 14:
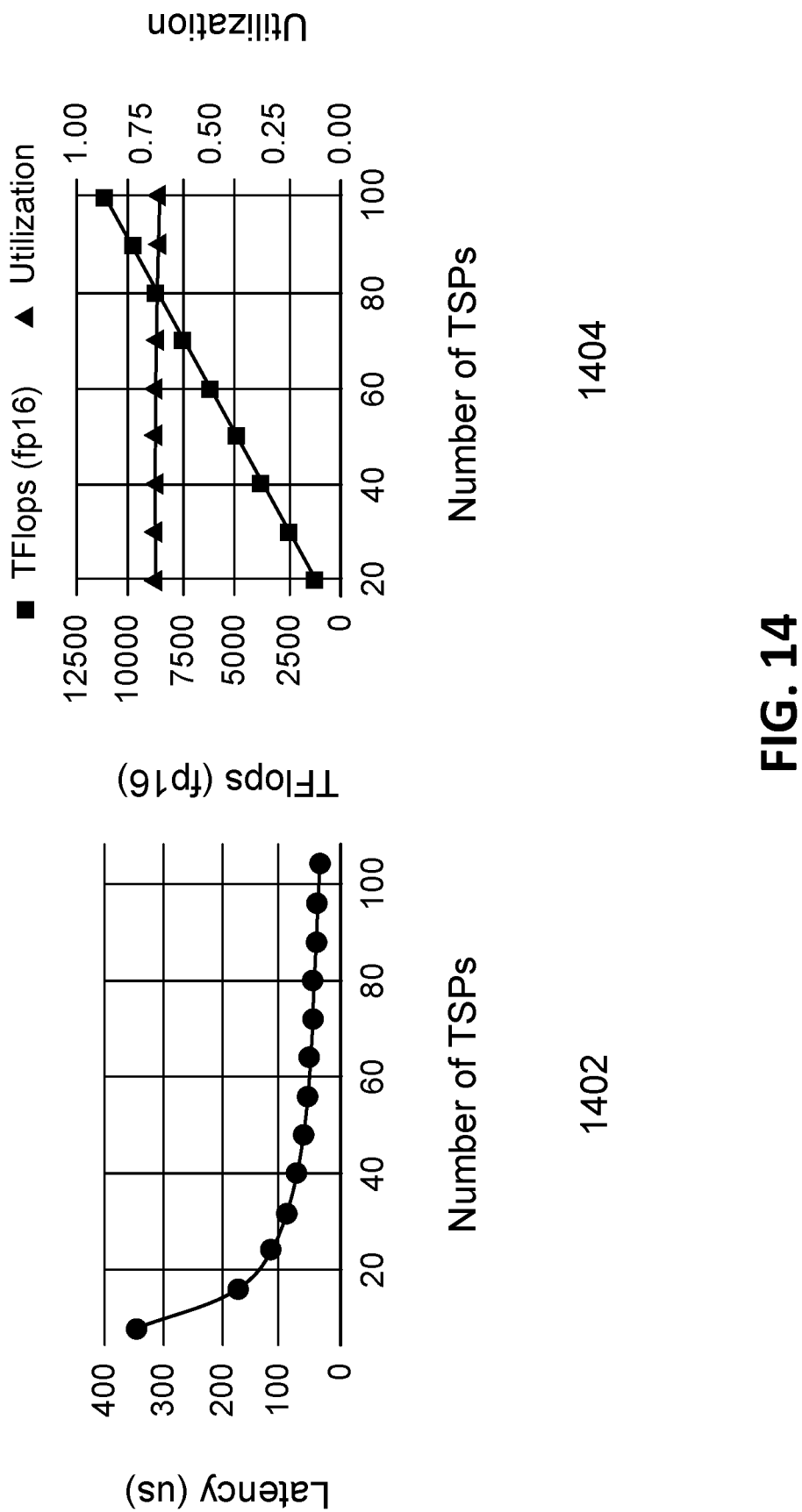
FIG. 14 illustrates graphs showing performance of a matrix-matrix computation on a multi-TSP system, in accordance with some embodiments.

FIG. 14 illustrates graphs showing performance of a matrix-matrix computation on a multi-TSP system, in accordance with some embodiments. The graphs illustrated in FIG. 13 relate to a [800×32576]×[32576×8192] matrix-matrix computation performed using a multi-TSP system having a Dragonfly-based topology such as that described previously, where each TSP operates at 900 MHz with a PCIe Gen4 ×16 host CPU interface. The first graph 1402 illustrates latency versus number of TSPs for performing the matrix operation, while the second graph 1404 illustrates throughput and utilization versus number of TSPs. As shown in FIG. 14, latency reduces as more row-wise splits are performed to add more TSPs for performing the computation, since adding more TSPs adds both compute processing elements and communication (C2C) links, allowing the system performance to grow proportionally as we add more TSPs.

Figure 15:
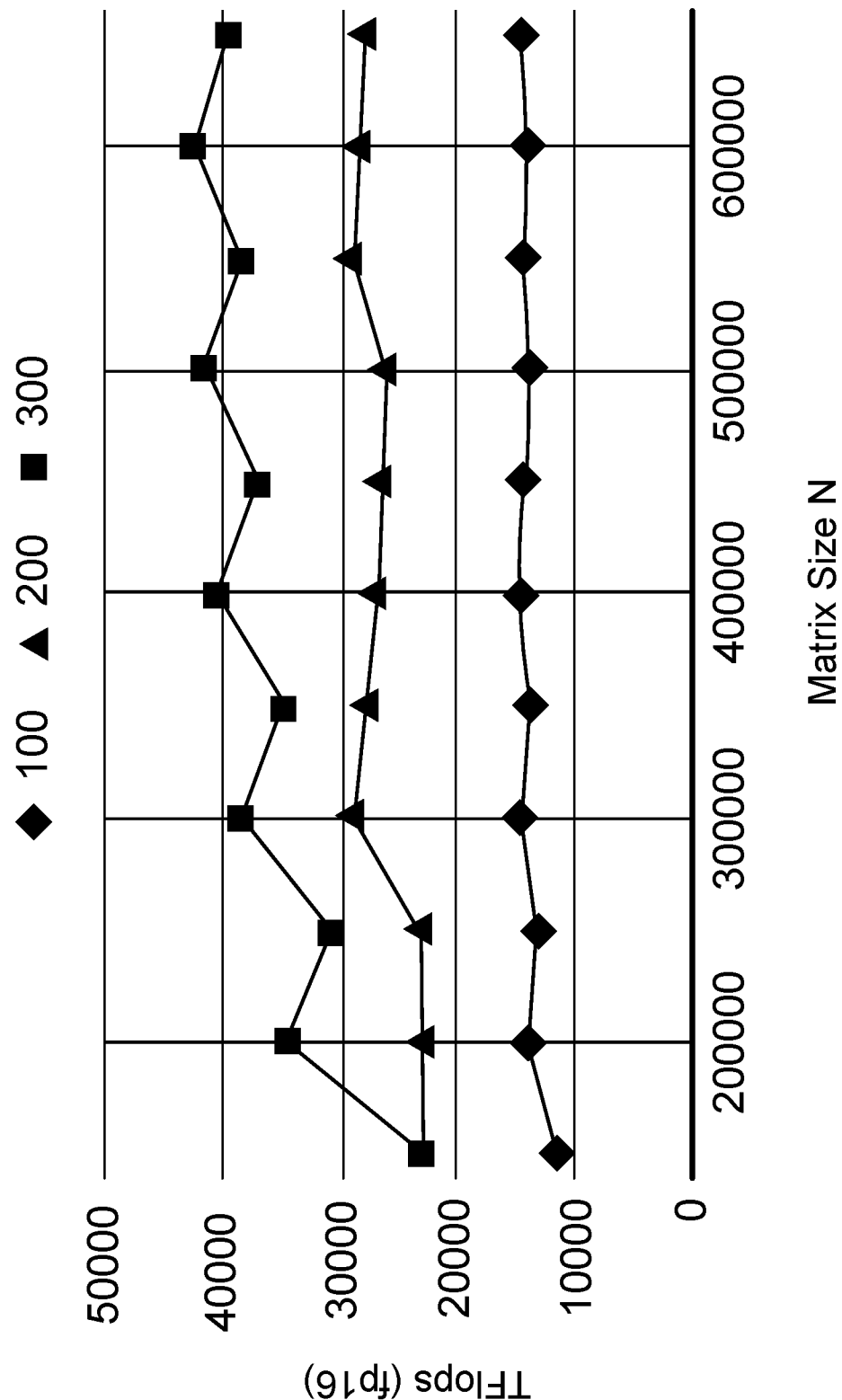
FIG. 15 illustrates a graph showing throughput for a matrix multiplication for different cluster sizes, in accordance with some embodiments.

In some embodiments, column-wise splits are used for large matrix operations on a cluster of TSPs to avoid any large reductions of partial products, and reduce 10 bandwidth requirements that are required in row-wise splits. FIG. 15 illustrates a graph showing throughput for a matrix multiplication for different cluster sizes, in accordance with some embodiments. For example, FIG. 15 illustrates a matrix operation [N×N]×[N×N] decomposed to X [N×N]× [N×(N/X)] operations run on X TSPs, e.g., for clusters of 100, 200, or 300 TPSs. In some embodiments, in comparison to matrix operations run on conventional multi-GPU clusters, over 100 times more fp16 throughput is achieved compared to the peak performance on 432 GPUs. This achieves approximately 2800 (fp64) TFlops on matrix sizes of 650000×650000.

The results shown in FIG. 14 highlight how using column-wise and row-wise weight splits complement each other and can yield extremely low-latency matrix-matrix operations. The split scheme produces good results for the matrix dimensions discussed above. However, depending on the ML model or workload, these dimensions can vary drastically, yielding different split schemes. For example, in scenarios where the resultant matrix is relatively small, row-wise splits may outperform column-wise splits, since communication bandwidth needs are limited. Additionally, with the system topology described above, reductions within a node are extremely efficient since each TSP within the node has direct access to the other TSPs within that node (e.g., 7 other TSPs).

In some embodiments, input bandwidth requirements may vary drastically depending on the data ordering of the computation. For example, decomposing a matrix-matrix operation on a single TSP involves decomposing the operations into a sequence of [1×K]×[K×320] operations, where K=160 for fp16 or K=320 for int8 data values. Depending on the sequence of K×320 tiles loaded into the matrix multiply unit on the TSP, the bandwidth requirements can change drastically. For example, for a [100000×100000] secondary weight matrix, if K×320 tiles are loaded in column-major order (e.g., load rows 0-159, followed by rows 160-320, and so on), approximately 570 GB/s of incoming bandwidth to the chip is required in order to maintain the computation throughput. However, traversing the secondary weight matrix in row-major order reduces demand on incoming bandwidth to only 3.7 GB/s, which is well within the channel capacity of a 16-lane PCIe Gen4 link. In the graph shown FIG. 14, it is assumed that input matrices are streamed over PCIe in the order (row, or column-order) that minimizes the injected data volume transferred across PCIe.

In some embodiments, collective operations are used to provide global communication among cooperating processing elements of the system. These performance-critical operations may bottleneck overall system performance because they are constrained by the slowest link, e.g., the network link having the highest channel load. This makes it critical to "load balance" the physical links of the network to avoid variation in the communication latency among communicating TSPs. For example, when performing an All-reduce operation across different tensor sizes, the combination of synchronous communication over a direct network with very low overhead may allow the All-reduce to quickly saturate the available network capacity.

In addition, in GPU or CPU systems with shared-memory semantics that communicate results via a shared DRAM, a flag (mutex) may be required to indicate when the data is produced (e.g., globally visible) and can be safely consumed. After writing the data, but before writing the flag, a memory fence may be required to ensure sequential consistency between producer and consumer. In contrast, the multi-TSP system does not require this additional semaphore (e.g., the mutex or flag variable), as the compiler tracks the total ordering of memory references and global time of reference. The consumer of the data respects the data dependence, and is only issued the data after the data is updated, ensuring a sequentially consistent view of global memory.

In some embodiments, the addition of additional TSPs of the system adds both compute resources (e.g., vector and matrix ALUs) as well as communication links to the direct interconnection network. In some embodiments, due to the predictable nature of the TSP at scale, linear scaling is achieved as more TSPs are added to the system.

Cholesky Factorization on TSPs

The matrix multiplication unit on the TSP consumes two matrices A and B, containing floating-point values having up to specified dimensions (e.g., with dimensions at most 160×320), and generates the output $AB^T$. The inputs are read from stream registers flowing outward, away from the vector processing unit in the center of the chip, and the output is written to stream registers flowing inward, toward the vector processing unit. In some embodiments, after generating an update vector S with the matrix multiplication unit, each iteration of Cholesky modifies it with the following vector operations:

def cholesky_vector_ops(S, U, i):
        (n, m)=np.shape(S)
        I=S[i:n, [i]]−U[0:n−i, [0]]
        splat=rsqrt(I[0][0])
        updates=I[0:n−i, [0]]*splat
        return (updates)

where I is the input matrix, i is the index of the current iteration, and rsqrt is a custom approximation of the reciprocal square root function. All of these operations are mapped onto the ALUs in the vector processing unit of the TSP, in order to modify the data in a single fly-by. In some embodiments, Cholesky is implemented on the TSP by channeling the data through the matrix and vector units of the TSP alternately.

Figure 16A:
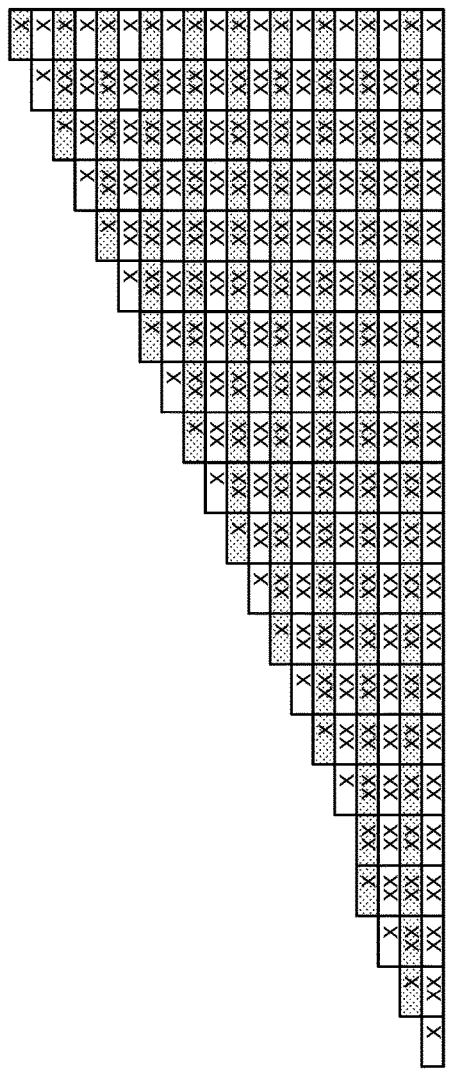
FIGS. 16A-16C illustrate aspects of Cholesky factorization across multiple TSPs in a multi-TSP system, in accordance with some embodiments.
Figure 16B:
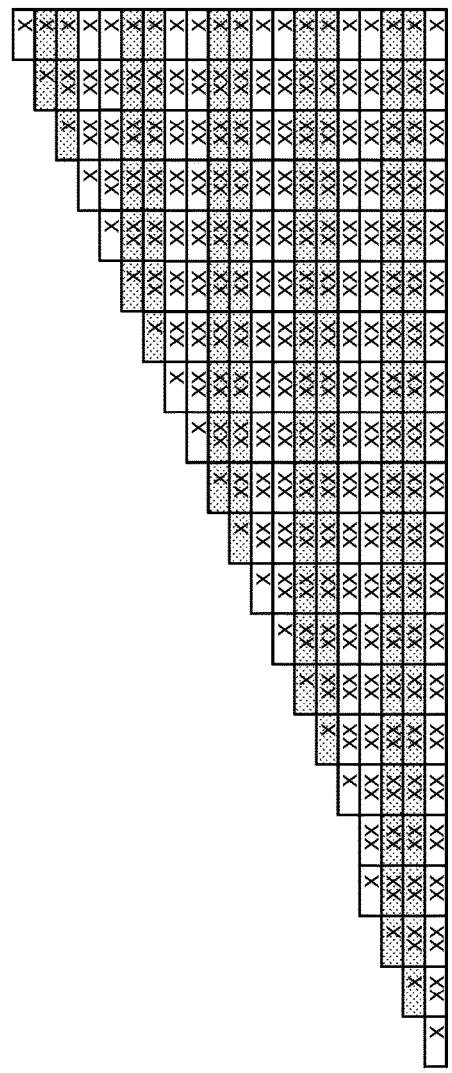
Figure 16C:
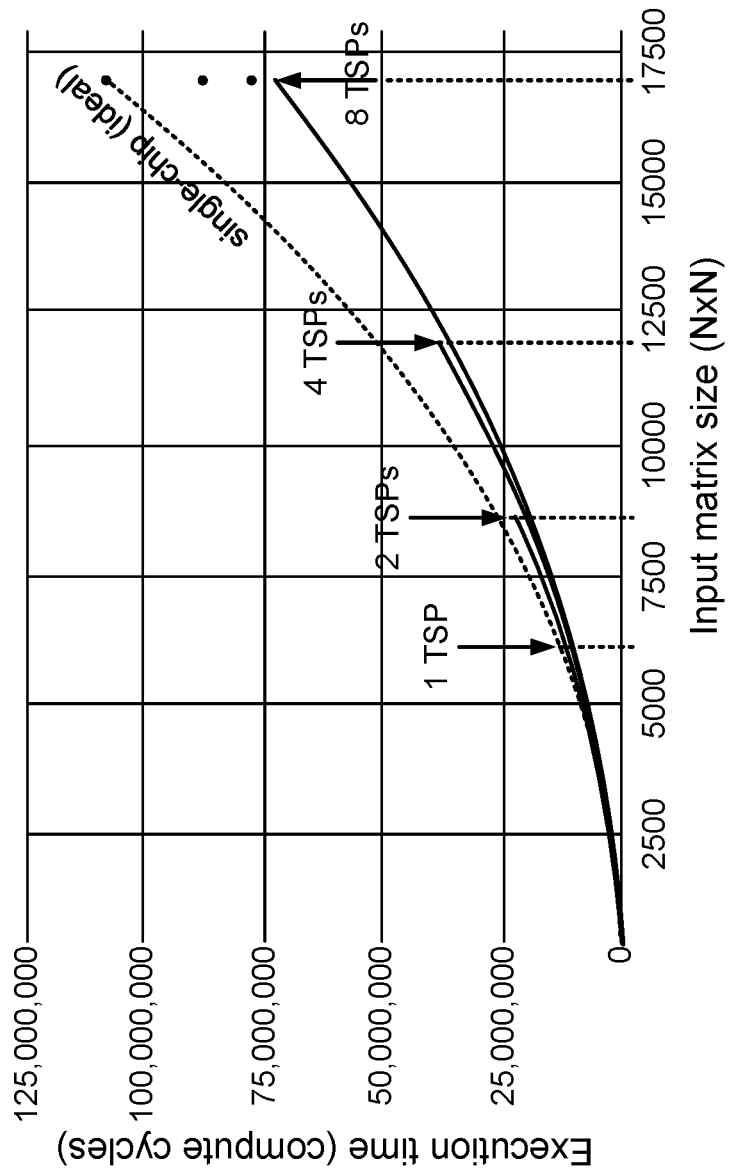

FIGS. 15A-15C illustrates aspects of Cholesky factorization across multiple TSPs in a multi-TSP system, in accordance with some embodiments. FIGS. 15A and 15B illustrate the matrix partitioned across multiple TSPs, using a block-cyclic distribution of 320 rows on each TSP, in accordance with some embodiments. FIG. 16A illustrates 320 rows interleaved across each chip, while FIG. 16B illustrates blocking across 2 rows and 2-chips. FIG. 16C illustrates a graph showing execution time versus problem size (e.g., input matrix size) with different numbers of TSPs, in accordance with some embodiments. The overall parallel execution time for Cholesky factorization is proportional to $$\frac{p^3}{3}$$

for a p×p input matrix, that when executed on multiple TSPs yields a net speedup of 1.2×, 1.4×, and 1.5x for 2, 4, and 8 TSPs, respectively as shown in FIG. 16C. In some embodiments, good scaling from 14.9 FP16 TFlops on 4 TSPs to 22.4 FP16 TFlops on 8 TSPs can be achieved, with 3× realized throughput compared to conventional multi-GPU systems.

The TSPs of the multi-TSP system participating in model parallel workload will exchange global results using an all-reduce across the system to distribute the result. This "collective" operation decomposes to many fine-grained vector reductions that are accumulated and then broadcast across all participants. In some embodiments, non-minimal routing and per-device compute capacity is utilized to efficiently distribute and accumulate partial reductions bidirectionally. In some embodiments, the worst-case latency in a 256-TSP system (e.g., 32 nodes) uses only three (3) hops and thus, in a system having a pipelined network latency of 722 ns per hop, an all-reduce across all TSPs has a pipelined network latency of 722 ns per hop×3 hops=2,166 ns, or ≈2.1 μsec. For example, a three-stage, hierarchical all-reduce uses the 8-way fully connected TSPs within each node as the first stage, the four global links between nodes for the second stage, and final 8-way fully connected network within each node to complete the hierarchical all-reduce.

Other Considerations

State of the art NLP workloads have billions of model parameters requiring both memory capacity and bandwidth to move those parameters into the PEs where they are computed on. In some embodiments, the software-defined multi-TSP network allows the TSPs in the system to communicate synchronously with no wasted execution incurred for barriers. Embodiments discussed herein relate to system architectures for a novel, purpose-built commercial system for scalable ML and converged HPC applications. The tensor streaming processors (TSPs) provide the compute elements for efficient fused-dot-product, vector-matrix, and matrix-matrix operations. The novel source-based, software-scheduled routing algorithm allows the automatic parallelizing compiler to load balance the global links of the Dragonfly-based multi-TSP network. This deterministic load balancing allows the compiler to schedule the physical network channels by spreading a large tensor across multiple non-minimal paths to maximize throughput, or use minimal routing to accomplish a barrier-free all-reduce with minimal end to end latency. The TSP's stream programming model can be extended from a single-chip to large scale system-wide determinism using a combination of hardware-alignment counters and ISA support to facilitate runtime deskew operations to provide the illusion of a globally synchronous distributed system. This simplifies the communication model, and allows for barrier-free synchronization yielding fast collective operations (e.g., all-reduce) and lock-free access to global SRAM.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description should be read to include one or at least one and the singular also includes the plural unless it is obvious that it is meant otherwise.

Upon reading this disclosure, those of skill in the art will appreciate still additional alternative structural and functional designs for a system and a process for compiling a statically scheduled binary for a predictive model. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined.

What is claimed is:

1. A system comprising:
    a network of processors, comprising:
        a plurality of processors arranged in a plurality of nodes, comprising at least a first node having a first plurality of deterministic processors connected by local links;
        wherein the plurality of nodes are connected by global links; and wherein the plurality of processors communicate with each other to establish a global counter for the network, enabling deterministic communication between the plurality of processors of the network; and
    a compiler to explicitly schedule communication traffic across the global and local links with explicit send or receive instructions executed at specific times to establish a specific ordering of operations performed by the network of processors.

2. The system of claim 1, wherein each processor of the network of processors is a deterministic processor.

3. The system of claim 2, wherein each deterministic processor comprises one or more deterministic data paths connecting rows of deterministic functional units, each functional unit configured to process data received from, or output processed data onto, at least one data path, in accordance with a plurality of instructions which are executed at a known clock cycle.

4. The system of claim 1, wherein each of the plurality of processors comprises n local links and m global links, and wherein the first plurality of processors comprises n+1 processors, wherein each of the n+1 processors is connected via a respective local link to each other processor of the first node, and wherein each local link comprises a synchronous link.

5. The system of claim 4, wherein the plurality of nodes comprises up to ((n+1)*m)+1 nodes, and wherein each of the up to ((n+1)*m)+1 nodes is connected to each remaining node of the up to ((n+1)*m)+1 nodes via a respective global link and wherein each global link comprises a synchronous link.

6. The system of claim 1, wherein the plurality of nodes are grouped into racks each having a set of global links, each rack having a set of nodes connected to each other via a first portion of the set of global links, and is connected to each remaining rack of the plurality of racks via a second portion of the set of global links.

7. The system of claim 6, wherein the set of nodes within each rack are doubly connected to each other via the first portion of the set of global links, and wherein the racks are singly connected via the second portion of the set of global links.

8. The system of claim 6, wherein the set of nodes of each rack includes a hot spare node, and wherein, responsive to detection of a critical error, the system is configured to perform a runtime reply of an inference during which the critical error was detected, where computation of a node of a rack associated with the detected critical error is switched to the hot spare node.

9. The system of claim 1, wherein each processor of the plurality of processors implements a first counter, wherein the first counter of each of the plurality of processors is synchronized with those of other processors of the plurality of processors to establish the global counter for the network.

10. The system of claim 9, wherein synchronizing the first counter of a first processor with the first counter of a second processor of the plurality of processors comprises:
    transmitting, at a first time, a first value of the first counter of the first processor corresponding to the first time to the second processor, wherein the second processor is configured to, upon receiving the first value of the first counter from the first processor, reflect the first value back to the first processor;
    determining a latency value of a link connecting the first processor and the second processor, based upon a difference between the first value of the first counter with a second value of the first counter of the first processor corresponding to a second time at which the reflected first value is received by the first processor;
    transmitting, at a third time, a third value of the first counter of the first processor corresponding to the third time; and
    responsive to receiving the third value at the second processor, adjusting a value of the first counter of the second processor based upon the third value and the determined latency value.

11. The system of claim 10, wherein the first processor is configured to transmit a value of its first counter to the second processor periodically.

12. The system of claim 9, wherein a first processor and a second processor of the plurality of processors are configured to perform an initial program alignment operation, comprising:
    placing the second processor into a synchronization loop, wherein the second processor checks for an instruction transmitted from the first processor at each overflow boundary of the first counter of the second processor;
    at a first time corresponding to an overflow boundary of the first counter of the first processor, transmitting an instruction from the first processor to the second processor;
    causing the second processor to exit the synchronization loop and begin synchronized computation at an overflow boundary of the first counter of the second processor occurring after the instruction from the first processor is received; and
    causing the first processor to begin synchronized computation at an overflow boundary of the first counter of the first processor aligned with the overflow boundary of the first counter of the second processor.

13. The system of claim 9, wherein each processor of the plurality of processors further implements a second counter, and is configured to periodically delay for a target number of cycles based upon a difference between the first counter and the second counter.

14. The system of claim 1, wherein the plurality of processors are configured to operate based upon a compiled program, wherein the compiled program includes an explicit schedule of instructions causing the plurality of processors to communicate with each other with a predetermined timing.

15. The system of claim 14, wherein the compiled program schedules a transmission of data between a first processor and a second processor of the plurality of processors by scheduling a first instruction at the first processor configured to cause a functional unit of the first processor to read data onto a data path of the first processor at a first time, and a second instruction at the second processor configured to cause a functional unit of the second processor to consume data on a data path of the second processor at a second time.

16. The system of claim 15, wherein the transmission occurs without the second processor sending a communication to the first processor to request the transmission of data.

17. The system of claim 14, wherein the compiled program is generated by a compiler based on a model, and wherein the compiler schedules each instruction of the schedule of instructions to prevent routing deadlock on the local and global links due to transmission of data between the processors of the network, based on a topology of the network and determined latency values of the local and global links.

18. The system of claim 17, where the compiler is configured to divide the compiled program into a plurality of sub-programs, and assigns each sub-program to a respective processor of the plurality of processors.

19. The system of claim 18, wherein the compiler is configured to select the respective processors of the plurality of processors by identifying a pinch point within the model corresponding to a portion of the model with a reduced volume of data communication, and assigning sub-programs corresponding to different sides of pinch point to respective processors of different nodes of the plurality of nodes.

20. The system of claim 17, wherein the compiler is configured to schedule a transmission of data between a first processor and a second processor of the network by dividing the data into a plurality of data portions, and scheduling instructions to cause the first processor to transmit each of the plurality of data portions via a different non-minimal path to the second processor.

21. The system of claim 20, wherein each non-minimal path comprises at least a first link connecting the first processor to one or more intermediate processors, and a second link connecting the one or more intermediate processors to the second processor.

* * * * *